(12) United States Patent
Abei et al.

(10) Patent No.: US 10,677,177 B2
(45) Date of Patent: Jun. 9, 2020

(54) ENGINE CONTROL STRATEGY

(71) Applicant: Walbro LLC, Tucson, AZ (US)

(72) Inventors: Takashi Abei, Sendai (JP); Martin N. Andersson, Caro, MI (US); Cyrus M. Healy, Ubly, MI (US)

(73) Assignee: Walbro LLC, Tucson, AZ (US)

( * ) Notice: Subject to any disclaimer, the term of this patent is extended or adjusted under 35 U.S.C. 154(b) by 0 days.

(21) Appl. No.: 16/437,142

(22) Filed: Jun. 11, 2019

(65) Prior Publication Data

US 2019/0293006 A1    Sep. 26, 2019

Related U.S. Application Data

(62) Division of application No. 15/743,857, filed as application No. PCT/US2016/043572 on Jul. 22, 2016, now Pat. No. 10,473,042.

(Continued)

(51) Int. Cl.
*F02D 35/00*    (2006.01)
*F02D 41/14*    (2006.01)
(Continued)

(52) U.S. Cl.
CPC ..... *F02D 35/0053* (2013.01); *F02D 41/0097* (2013.01); *F02D 41/1454* (2013.01); *F02D 41/1475* (2013.01); *F02D 41/1498* (2013.01); *F02P 5/06* (2013.01); *B60W 2710/0644* (2013.01); *F02D 2200/101* (2013.01); *F02D 2200/1012* (2013.01); *F02D 2400/06* (2013.01)

(58) Field of Classification Search
CPC ............ F02D 35/0053; F02D 41/0097; F02D 41/1454; F02D 41/1475; F02D 41/1498; F02D 2200/101; F02D 2200/1012; F02D 2400/06; F02P 5/06; B60W 2710/0644
USPC .......................................................... 701/103
See application file for complete search history.

(56) References Cited

U.S. PATENT DOCUMENTS 5,226,920 A    7/1993  Andreasson
5,413,078 A *  5/1995  Mitsunaga .......... F02D 41/0002
                                              123/492

(Continued)

FOREIGN PATENT DOCUMENTS

| EP | 3085929 A2 | 10/2016 |
| JP | H05248281 A | 9/1993 |
| WO | WO2012115548 A1 | 8/2012 |

OTHER PUBLICATIONS

SE Office Action for SE Application No. 1850053-8 dated Apr. 29, 2019 (12 pages).

*Primary Examiner* — Mahmoud Gimie
(74) *Attorney, Agent, or Firm* — Reising Ethington P.C.

(57) ABSTRACT

At least some implementations of a method of distinguishing between two loads being driven by an engine, includes the steps of determining engine speed at defined intervals, comparing a second engine speed against a previously determined first engine speed, determining if the second engine speed fits an expected pattern of engine speeds, and counting either the number of incidents where the second engine speed does not fit the expected pattern, or the number of incidents where the second engine speed does fit the expected pattern, or some combination of these two. A method of determining if an engine is operating at least near a lean limit of its air to fuel ratio is also disclosed.

9 Claims, 17 Drawing Sheets

Related U.S. Application Data

(60) Provisional application No. 62/195,348, filed on Jul. 22, 2015.

(51) Int. Cl.
  *F02D 41/00* (2006.01)
  *F02P 5/06* (2006.01)

(56) References Cited

U.S. PATENT DOCUMENTS

| | | | |
|---|---|---|---|
| 5,832,895 A * | 11/1998 | Takahashi | F02D 11/105 |
| | | | 123/350 |
| 6,351,942 B1 * | 3/2002 | Nishimura | F02D 41/0285 |
| | | | 60/285 |
| 7,000,595 B2 | 2/2006 | Andersson et al. | |
| 7,198,028 B2 | 4/2007 | Andersson et al. | |
| 7,467,785 B2 | 12/2008 | Braun | |
| 2007/0137617 A1 | 6/2007 | Schueler et al. | |
| 2008/0042643 A1 | 2/2008 | Maier et al. | |
| 2013/0160536 A1 | 6/2013 | Majima | |
| 2013/0261936 A1 * | 10/2013 | Suzuki | F02D 41/3005 |
| | | | 701/104 |

* cited by examiner

ENGINE CONTROL STRATEGY

REFERENCE TO CO-PENDING APPLICATION

This application is a divisional of U.S. patent application Ser. No. 15/743,857 filed on Jan. 11, 2018 which is a national phase of PCT/US2016/043572, filed Jul. 22, 2016 and claims the benefit of U.S. Provisional Application No. 62/195,348 filed Jul. 22, 2015. The entire contents of these priority applications are incorporated herein by reference in their entireties.

TECHNICAL FIELD

The present disclosure relates generally to an engine feedback control strategy.

BACKGROUND

Combustion engines are provided with a fuel mixture that typically includes liquid fuel and air. The air/fuel ratio of the fuel mixture may be calibrated for a particular engine, but different operating characteristics such as type of fuel, altitude, condition of filters or other engine components, and differences among engines and other components in a production run may affect engine operation. Also, different loads or tools may be used with a given engine and they loads/tools may affect engine operation or performance.

SUMMARY

At least some implementations of a method of distinguishing between two loads being driven by an engine, includes the steps of determining engine speed at defined intervals, comparing a second engine speed against a previously determined first engine speed, determining if the second engine speed fits an expected pattern of engine speeds, and counting either the number of incidents where the second engine speed does not fit the expected pattern, or the number of incidents where the second engine speed does fit the expected pattern, or some combination of these two. The engine may be a four stroke engine and the defined interval is one engine revolution. In at least some implementations, the time or speed of each engine revolution is compared to the time or speed for the immediately prior engine revolution and the expected pattern includes alternating faster and slower revolutions. The method may also include tallying all counted incidents over a predetermined number of engine revolutions. And the tally may be compared against stored data, where the stored data includes information relating to at least two engine loads, to determine which of the engine loads is being driven by the engine based on the tally comparison.

At least some implementations of a method of determining if an engine is operating at least near a lean limit of its air to fuel ratio includes the steps of:

determining for a plurality of engine cycles the number of such engine cycles in which the engine speed either follows the normal pattern or the number of such engine cycles are outliers from such normal pattern; and if less than half of the engine cycles of such plurality follow the normal pattern or at least half are outliers from the normal pattern enriching the fuel to air ratio.

For each engine cycle of the plurality of engine cycles it may be determined whether or not each pair of engine intake and exhaust speeds follows the normal pattern. In at least some implementations, if less than half of the engine intake and exhaust speed pairs follow the normal pattern or at least half are outliers from the normal pattern the fuel to air ratio is enriched. For each engine cycle of the plurality of engine cycles it may be determined whether at least half of each pair of engine intake and exhaust speeds are outliers from the normal pattern and if so the fuel to air ratio is enriched. Each plurality of engine cycles may include, for example, at least 16 successive pairs of engine intake and exhaust engine speeds.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
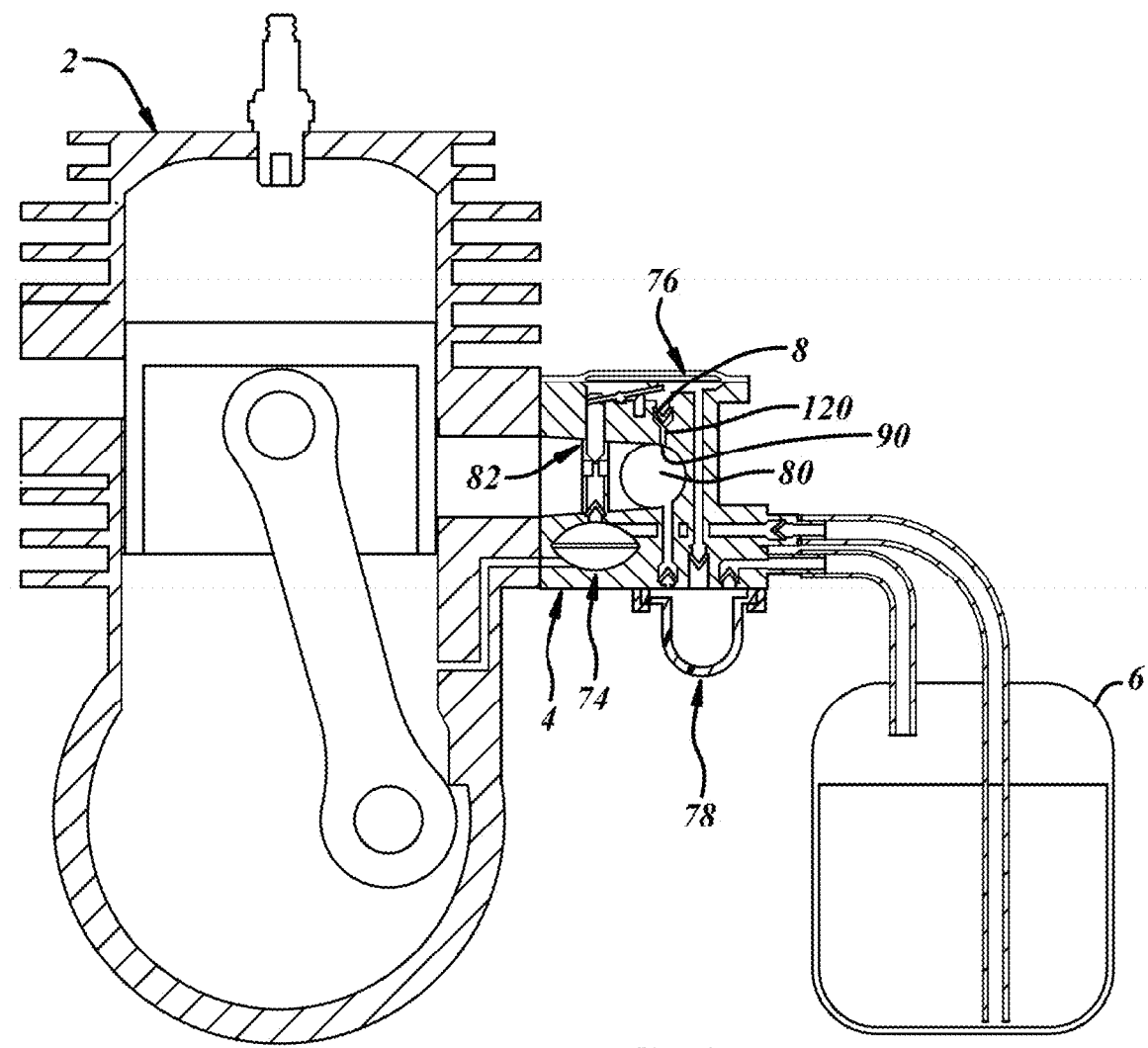
FIG. 1 is a schematic view of an engine and a carburetor including a fuel mixture control device.

Referring in more detail to the drawings, FIG. 1 illustrates an engine 2 and a charge forming device 4 that delivers a fuel and air mixture to the engine 2 to support engine operation. In at least one implementation, the charge forming device 4 includes a carburetor, and the carburetor may be of any suitable type including, for example, diaphragm and float bowl carburetors. A diaphragm-type carburetor 4 is shown in FIG. 1. The carburetor 4 takes in fuel from a fuel tank 6 and includes a mixture control device 8 capable of altering the air/fuel ratio of the mixture delivered from the carburetor. To determine a desired instantaneous air/fuel ratio, a comparison is made of the engine speed before and after the air/fuel ratio is altered. Based upon that comparison, the mixture control device 8 or some other component may be used to alter the fuel and air mixture to provide a desired air/fuel ratio.

Figure 2:
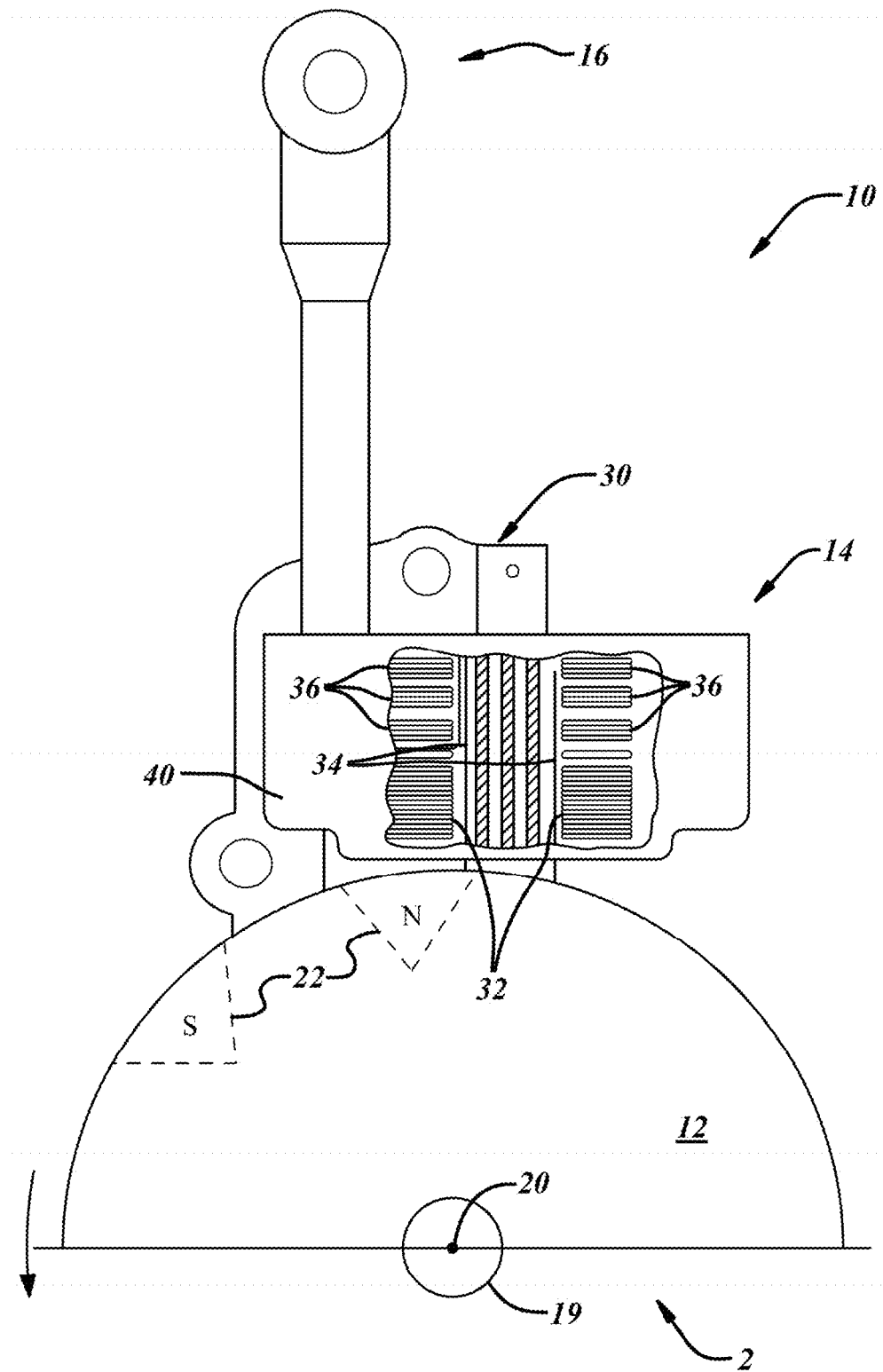
FIG. 2 is a fragmentary view of a flywheel and ignition components of the engine.
Figure 3:
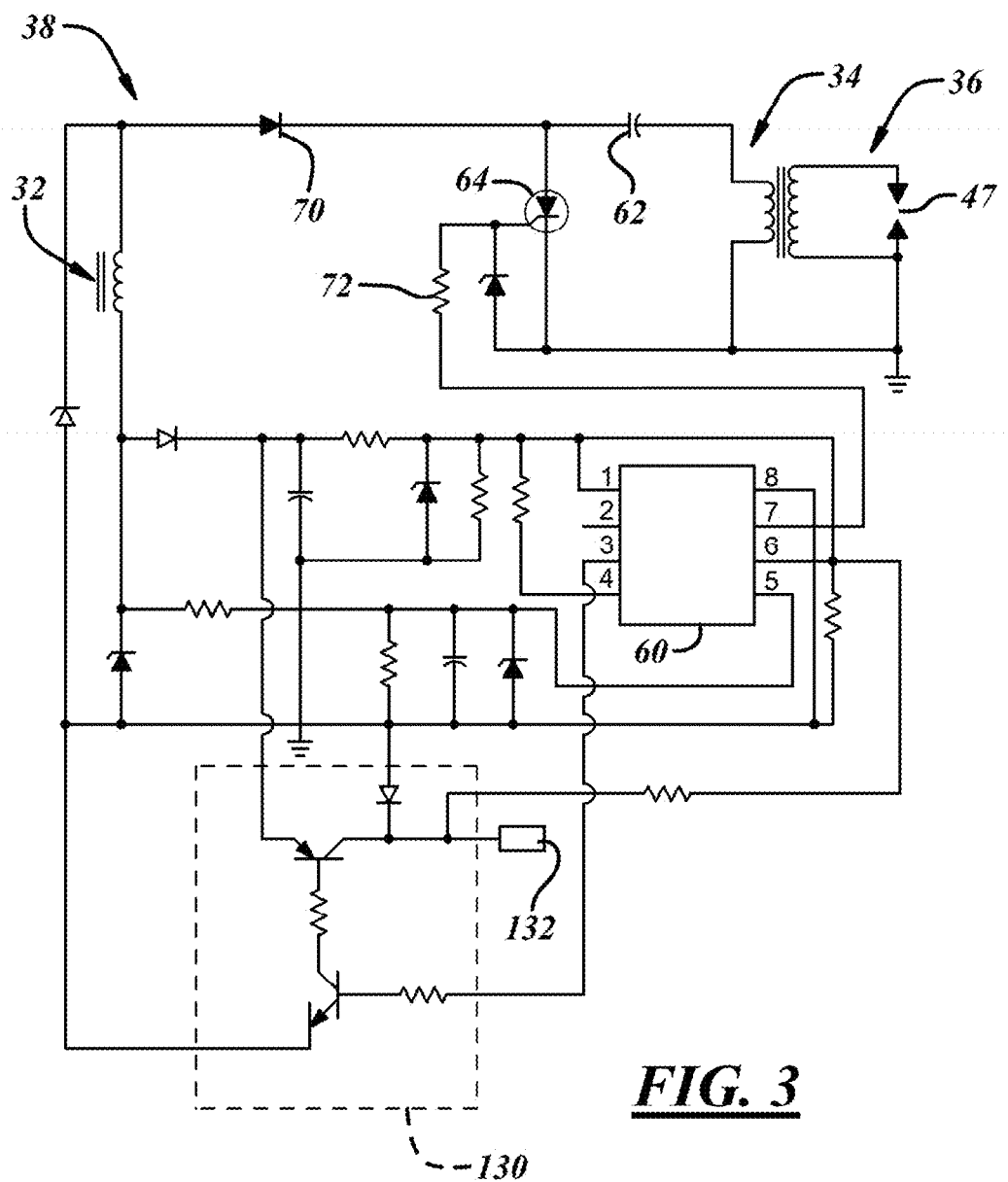
FIG. 3 is a schematic diagram of an ignition circuit.

The engine speed may be determined in a number of ways, one of which uses signals within an ignition system 10 such as may be generated by a magnet on a rotating flywheel 12. FIGS. 2 and 3 illustrates an exemplary signal generation or ignition system 10 for use with an internal combustion engine 2, such as (but not limited to) the type typically employed by hand-held and ground-supported lawn and garden equipment. Such equipment includes chainsaws, trimmers, lawn mowers, and the like. The ignition system 10 could be constructed according to one of numerous designs, including magneto or capacitive discharge designs, such that it interacts with an engine flywheel 12 and generally includes a control system 14, and an ignition boot 16 for connection to a spark plug (not shown).

The flywheel 12 rotates about an axis 20 under the power of the engine 2 and includes magnets or magnetic sections 22. As the flywheel 12 rotates, the magnetic sections 22 spin past and electromagnetically interact with components of the control system 14 for sensing engine speed among other things.

The control system 14 includes a ferromagnetic stator core or lamstack 30 having wound thereabout a charge winding 32, a primary ignition winding 34, and a secondary ignition winding 36. The primary and secondary windings 34, 36 basically define a step-up transformer or ignition coil used to fire a spark plug. The control system also includes a circuit 38 (shown in FIG. 3), and a housing 40, wherein the circuit 38 may be located remotely from the lamstack 30 and the various windings.

As the magnetic sections 22 are rotated past the lamstack 30, a magnetic field is introduced into the lamstack 30 that, in turn, induces a voltage in the various windings. For example, the rotating magnetic sections 22 induce a voltage signal in the charge winding 32 that is indicative of the number of revolutions of the engine 2 in the control system. The signal can be used to determine the rotational speed of the flywheel 12 and crankshaft 19 and, hence, the engine 2. Finally, the voltage induced in the charge winding 32 is also used to power the circuit 38 and charge an ignition discharge capacitor 62 in known manner. Upon receipt of a trigger signal, the capacitor 62 discharges through the primary winding 34 of the ignition coil to induce a stepped-up high voltage in the secondary winding 36 of the ignition coil that is sufficient to cause a spark across a spark gap of a spark plug 47 to ignite a fuel and air mixture within a combustion chamber of the engine.

In normal engine operation, downward movement of an engine piston during a power stroke drives a connecting rod (not shown) that, in turn, rotates the crankshaft 19, which rotates the flywheel 12. As the magnetic sections 22 rotate past the lamstack 30, a magnetic field is created which induces a voltage in the nearby charge winding 32 which is used for several purposes. First, the voltage may be used to provide power to the control system 14, including components of the circuit 38. Second, the induced voltage is used to charge the main discharge capacitor 62 that stores the energy until it is instructed to discharge, at which time the capacitor 62 discharges its stored energy across primary ignition winding 34. Lastly, the voltage induced in the charge winding 32 is used to produce an engine speed input signal, which is supplied to a microcontroller 60 of the circuit 38. This engine speed input signal can play a role in the operation of the ignition timing, as well as controlling an air/fuel ratio of a fuel mixture delivered to the engine, as set forth below.

Referring now primarily to FIG. 3, the control system 14 includes the circuit 38 as an example of the type of circuit that may be used to implement the ignition timing control system 14. However, many variations of this circuit 38 may alternatively be used without departing from the scope of the invention. The circuit 38 interacts with the charge winding 32, primary ignition winding 34, and preferably a kill switch 48, and generally comprises the microcontroller 60, an ignition discharge capacitor 62, and an ignition thyristor 64.

The microcontroller 60 as shown in FIG. 3 may be an 8-pin processor, which utilizes internal memory or can access other memory to store code as well as for variables and/or system operating instructions. Any other desired controllers, microcontrollers, or microprocessors may be used, however. Pin 1 of the microcontroller 60 is coupled to the charge winding 32 via a resistor and diode, such that an induced voltage in the charge winding 32 is rectified and supplies the microcontroller with power. Also, when a voltage is induced in the charge winding 32, as previously described, current passes through a diode 70 and charges the ignition discharge capacitor 62, assuming the ignition thyristor 64 is in a non-conductive state. The ignition discharge capacitor 62 holds the charge until the microcontroller 60 changes the state of the thyristor 64. Microcontroller pin 5 is coupled to the charge winding 32 and receives an electronic signal representative of the engine speed. The microcontroller uses this engine speed signal to select a particular operating sequence, the selection of which affects the desired spark timing. Pin 7 is coupled to the gate of the thyristor 64 via a resistor 72 and transmits from the microcontroller 60 an ignition signal which controls the state of the thyristor 64. When the ignition signal on pin 7 is low, the thyristor 64 is nonconductive and the capacitor 62 is allowed to charge. When the ignition signal is high, the thyristor 64 is conductive and the capacitor 62 discharges through the primary winding 34, thus causing an ignition pulse to be induced in the secondary winding 36 and sent on to the spark plug 47. Thus, the microcontroller 60 governs the discharge of the capacitor 62 by controlling the conductive state of the thyristor 64. Lastly, pin 8 provides the microcontroller 60 with a ground reference.

To summarize the operation of the circuit, the charge winding 32 experiences an induced voltage that charges ignition discharge capacitor 62, and provides the microcontroller 60 with power and an engine speed signal. The microcontroller 60 outputs an ignition signal on pin 7, according to the calculated ignition timing, which turns on the thyristor 64. Once the thyristor 64 is conductive, a current path through the thyristor 64 and the primary winding 34 is formed for the charge stored in the capacitor 62. The current discharged through the primary winding 34 induces a high voltage ignition pulse in the secondary winding 36. This high voltage pulse is then delivered to the spark plug 47 where it arcs across the spark gap thereof, thus igniting an air/fuel charge in the combustion chamber to initiate the combustion process.

As noted above, the microcontroller 60, or another controller, may play a role in altering an air/fuel ratio of a fuel mixture delivered by a carburetor 4 (for example) to the engine 2. In the embodiment of FIG. 1, the carburetor 4 is a diaphragm type carburetor with a diaphragm fuel pump assembly 74, a diaphragm fuel metering assembly 76, and a purge/prime assembly 78, the general construction and function of each of which is well-known. The carburetor 4 includes a fuel and air mixing passage 80 that receives air at an inlet end and fuel through a fuel circuit 82 supplied with fuel from the fuel metering assembly 76. The fuel circuit 82 includes one or more passages, port and/or chambers formed in a carburetor main body. One example of a carburetor of this type is disclosed in U.S. Pat. No. 7,467,785, the disclosure of which is incorporated herein by reference in its entirety. The mixture control device 8 is operable to alter the flow of fuel in at least part of the fuel circuit to alter the air/fuel ratio of a fuel mixture delivered from the carburetor 4 to the engine to support engine operation as commanded by a throttle.

Figure 5:
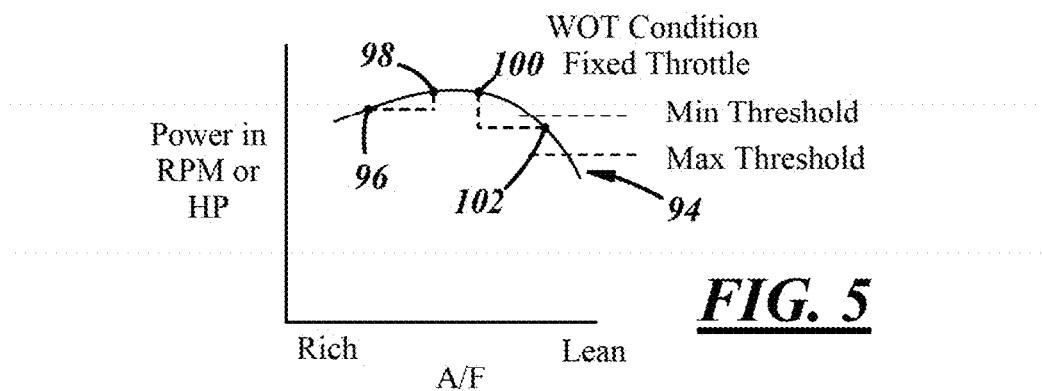
FIG. 5 is a graph of a representative engine power curve.

For a given throttle position, the power output for an engine will vary as a function of the air/fuel ratio. A representative engine power curve 94 is shown in FIG. 5 as a function of air/fuel ratio, where the air/fuel ratio becomes leaner from left-to-right on the graph. This curve 94 shows that the slope of the curve on the rich side is notably less than the slope of the curve on the lean side. Hence, when a richer fuel mixture is enleaned the engine speed will generally increase by a lesser amount than when a leaner fuel mixture is enleaned by the same amount. This is shown in FIG. 5, where the amount of enleanment between points 96 and 98 is the same as between points 100 and 102, yet the engine speed difference is greater between points 100 and 102 than it is between points 96 and 98. In this example, points 96 and 98 are richer than a fuel mixture that corresponds to engine peak power output, while point 100 corresponds to a fuel mixture that provides engine peak power output and point 102 is leaner than all of the other points.

Figure 4:
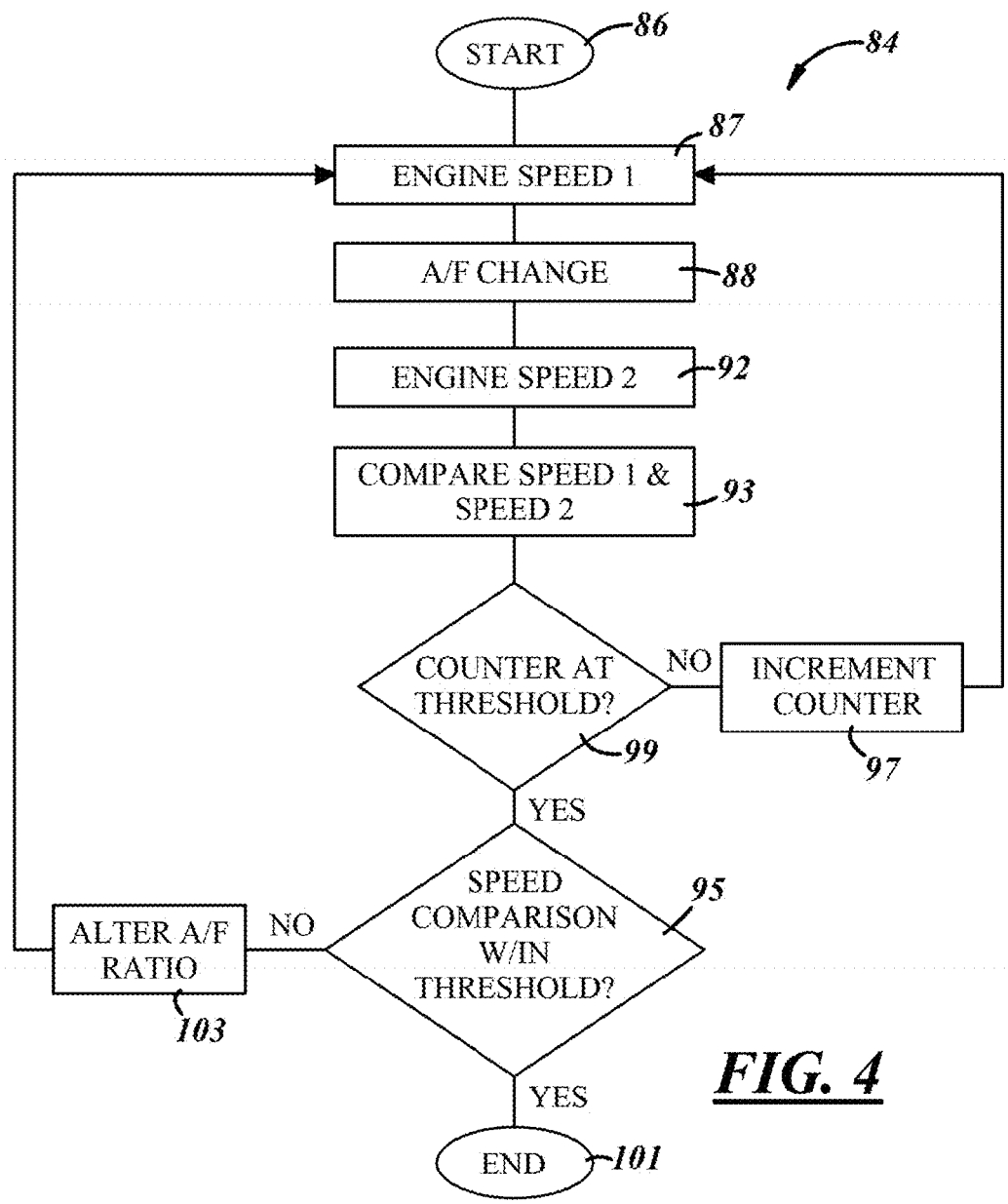
FIG. 4 is a flowchart for an engine control process.

The characteristics of the engine power curve 94 may be used in an engine control process 84 that determines a desired air/fuel ratio for a fuel mixture delivered to the engine. One example of an engine control process 84 is shown in FIG. 4 and includes an engine speed test wherein engine speed is determined as a function of a change in the air/fuel ratio of the fuel mixture, and an analysis portion where data from the engine speed test is used to determine or confirm a desired air/fuel ratio of the fuel mixture.

The engine control process 84 begins at 86 and includes one or more engine speed tests. Each engine speed test may essentially include three steps. The steps include measuring engine speed at 87, changing the air/fuel ratio of the fuel mixture provided to the engine at 88, and then measuring the engine speed again at 92 after at least a portion of the air/fuel ratio change has occurred.

The first step is to measure the current engine speed before the fuel mixture is enleaned. Engine speed may be determined by the microcontroller 60 as noted above, or in any other suitable way. This is accomplished, in one implementation, by measuring three engine speed parameters with the first being the cyclic engine speed. This is the time difference for one revolution of the engine. In most engines, there is a large amount of repeatable cyclic engine speed variation along with a significant amount of non-repeatable cyclic engine speed variation. This can be seen in FIG. 6, where the cyclic engine speed is shown at 104. Because this cyclic variability is difficult to use in further determinations, a rolling average (called F1-XX) is created, where XX is the number of revolutions being averaged, and generally F1 is a low averaging value such as 4 or 6. This greatly eliminates the large repeatable cyclic engine speed variation but does not dampen out too much the non-repeatable cyclic engine speed variation. The third engine speed value is F2-XX, and F2 is a greater averaging value, such as 80 revolutions. This amount of averaging greatly dampens out any variations of speed change and the intent is to dampen out the effect of the enleanment engine speed change. Now that there are two usable rpm values, F1-6 and F2-80 in this example, the difference of these values can be used to represent the engine speed change caused by the enleanment of the fuel mixture during an engine speed test.

In addition to measuring engine speed, the engine speed test includes changing the air/fuel ratio of the fuel mixture delivered to the engine. This may be accomplished with the mixture control device, e.g. solenoid valve 8 may be actuated thereby changing an air/fuel ratio of a mixture delivered to the engine 2 from the carburetor 4. In at least some implementations, the solenoid valve 8 may be actuated to its closed position to reduce fuel flow to a main fuel port or jet 90, thereby enleaning the fuel and air mixture. The valve 8 may be closed for a specific time period, or a duration dependent upon an operational parameter, such as engine speed. In one form, the valve 8 is closed (or nearly closed) for a certain number or range of engine revolutions, such as 1 to 150 revolutions. This defines an enleanment period wherein the leaner fuel and air mixture is delivered to the engine 2. Near, at or just after the end of the enleanment period, the engine speed is again determined at 92 as noted above.

Figure 6:
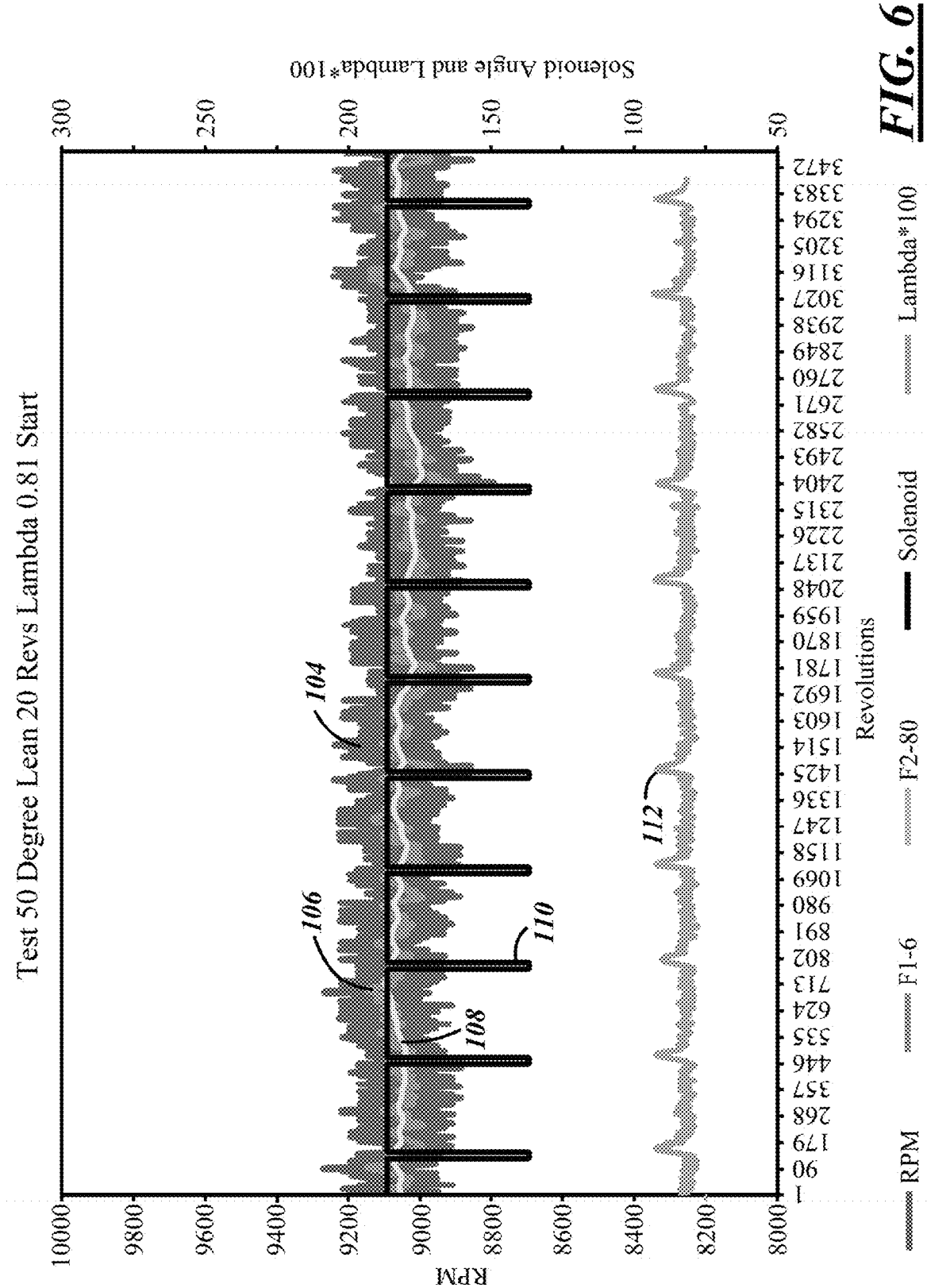
FIGS. 6-8 are graphs showing several variables that may be tracked during an engine speed test.
Figure 7:
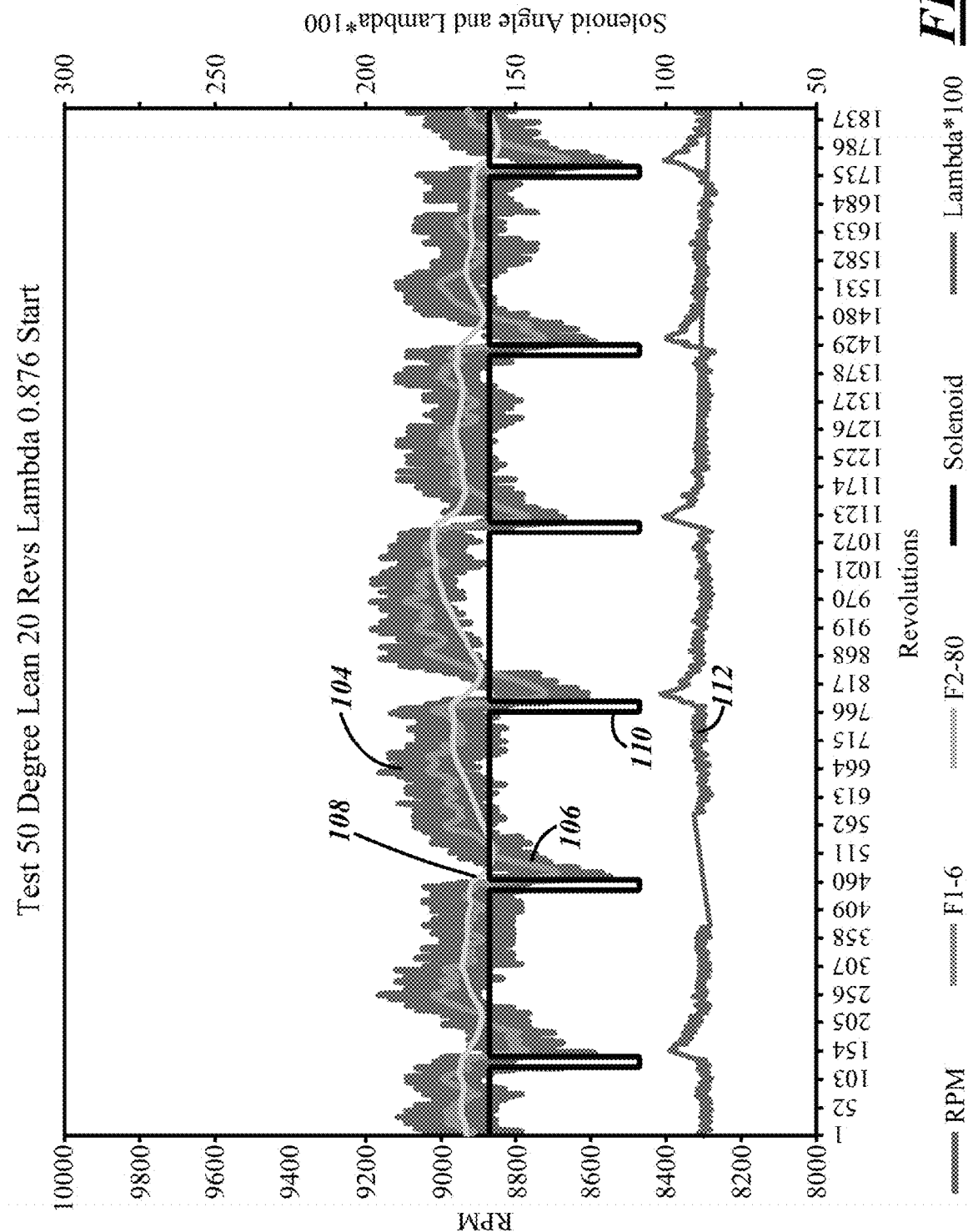
Figure 8:
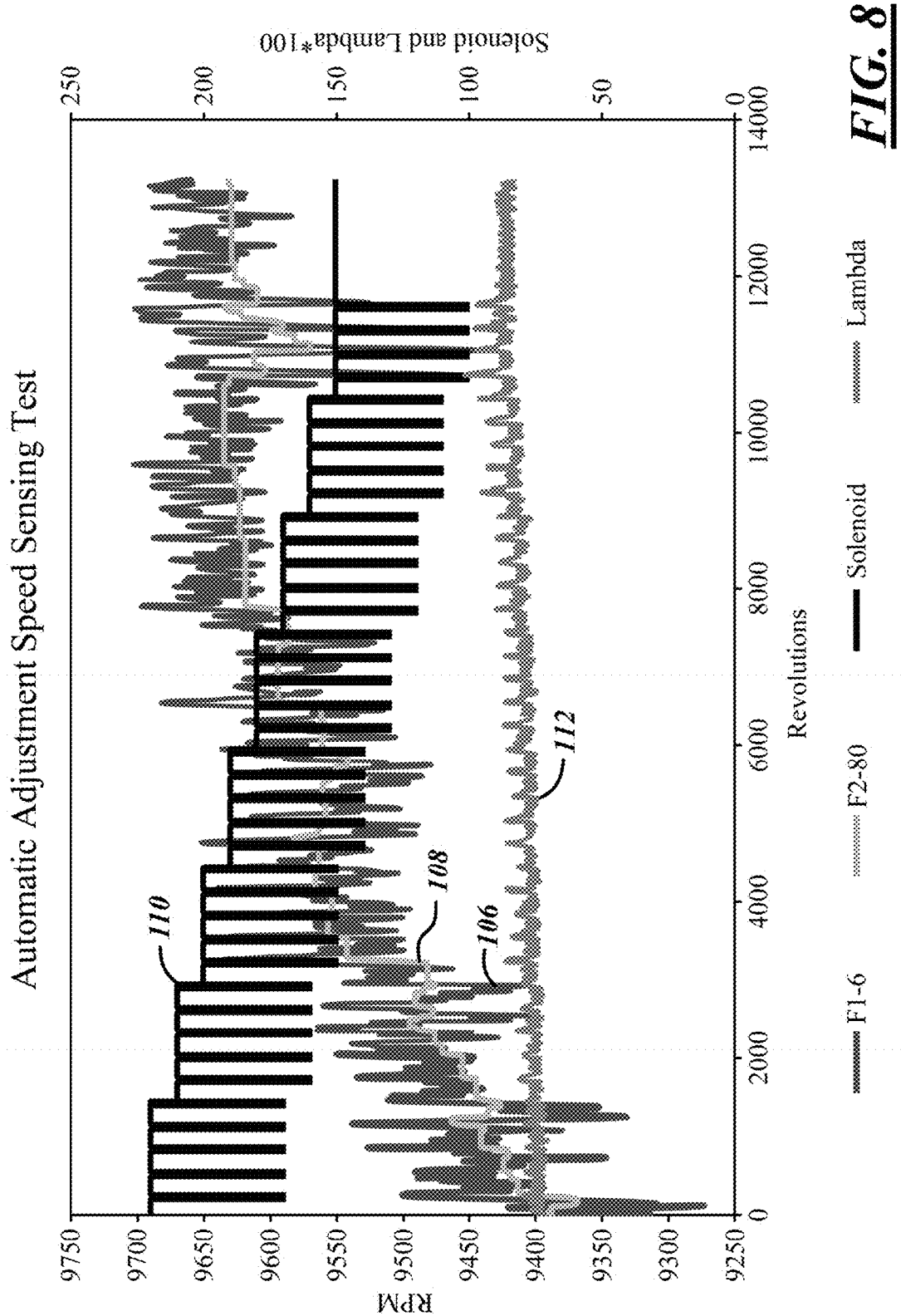

FIGS. 6-8 show engine speed (in rpm) versus number of engine revolutions during one or more engine speed tests. F1-6 is shown by line 106, F2-80 is shown by line 108, the solenoid actuation signal is shown by line 110, and a fuel/air ratio (Lambda) is shown by line 112.

FIG. 6 shows the initial air/fuel ratio to be rich at Lambda=0.81. The amount of enleanment in the example test was 50 degrees for 20 revolutions. This means that the solenoid valve was actuated 50 degrees earlier in the engine stroke than it would have been for normal engine operation (e.g. operation other than during the test). The increased duration of solenoid actuation leads to an enleaned fuel mixture. From this enleanment, the average rpm difference of F1-6 and F2-80 is 30 rpm. Because the enleanment is so large, 50 degrees, a decrease of 30 rpm is observed even though the initial air/fuel ratio is still 6% richer than a fuel mixture ratio that would yield peak engine power.

FIG. 7 shows the same 50 degree enleanment test for 20 revolutions but the starting air/fuel ratio is at Lambda=0.876 which approximately corresponds to peak engine power. The average engine speed difference between F1-6 and F2-80 in this example is 148 rpm, approximately five times greater than the speed difference from a starting air/fuel ration of Lambda=0.81.

Because the process as described involves enleaning a fuel mixture, the initial or calibrated air/fuel ratio should be richer than desired. This ensures that at least some enleanment will lead to a desired air/fuel ratio. In at least some implementations, the initial air/fuel ratio may be up to about 30% richer than the fuel mixture corresponding to peak engine power. Instead of or in addition to enleaning, enriching the fuel mixture may be possible in a given carburetor construction, and in that case the engine speed test could include an enriching step if an unduly lean air/fuel ratio where determined to exist. Enriching may be done, for example, by causing additional fuel to be supplied to the engine, or by reducing air flow. The process may be simpler by starting with a richer fuel mixture and enleaning it, as noted herein.

Referring again to the engine control process shown in FIG. 4, the two engine speed measurements obtained at 87 and 92 are compared at 93. To improve the accuracy of the engine control process, several engine speed tests may be performed, with a counter incremented at 97 after each engine speed test, and the counter compared to a threshold at 99 to determine if a desired number of engine speed tests have been performed. If a desired number of tests have been performed, the process 84 then analyzes the data from the engine speed test(s).

To determine whether the fuel mixture delivered to the engine before the engine speed tests were performed was within a desired range of air/fuel ratios, the engine speed differences determined at 93 are compared against one or more thresholds at 95. Minimum and maximum threshold values may be used for the engine speed difference that occurs as a result of enleaning the fuel mixture provided to the engine. An engine speed difference that is below the minimum threshold (which could be a certain number of rpm's) likely indicates that the air/fuel ratio before that enleanment was richer than a mixture corresponding to peak engine power. Conversely, an engine speed difference that is above the maximum threshold (which could be a certain number of rpm's) indicates that the air/fuel ratio became too lean (indicating the fuel mixture started leaner than a peak power fuel mixture, as noted above). In at least some implementations, the minimum threshold is 15 rpm, and the maximum threshold is 500 rpm or higher. These values are intended to be illustrative and not limiting—different engines and conditions may permit use of different thresholds In the process 84 shown in FIG. 4, the engine speed test is performed multiple times in a single iteration of the process 84. In one iteration of the process 84, it is determined at 95 if the engine speed difference of any one or more of the engine speed tests is within the threshold values, and if so, the process may end at 101. That is, if a threshold number (one or more) of the determined engine speed differences from 93 are within the thresholds, the process may end because the starting air/fuel ratio (e.g. the air/fuel ratio of the mixture prior to the first engine speed test of that process iteration) is at or within an acceptable range of a desired air/fuel ratio. In one implementation, five engine speed tests may be performed, and an engine speed difference within the thresholds may be required from at least three of the five engine speed tests. Of course, any number of engine speed tests may be performed (including only one) and any number of results within the thresholds may be required (including only one and up to the number of engine speed tests performed).

If a threshold number of engine speed differences (determined at 93) are not within the thresholds, the air/fuel ratio of the mixture may be altered at 103 to a new air/fuel ratio and the engine speed tests repeated using the new air/fuel ratio. At 95, if an undesired number of engine speed differences were less than the minimum threshold, the air/fuel ratio of the fuel mixture may be enleaned at 103 before the engine speed tests are repeated. This is because an engine speed difference less than the minimum threshold indicates the fuel mixture at 87 was too rich. Hence, the new air fuel ratio from 103 is leaner than when the prior engine speed tests were performed. This can be repeated until a threshold number of engine speed differences are within the thresholds, which indicates that the fuel mixture provided to the engine before the engine speed tests were conducted (e.g. at 87) is a desired air/fuel ratio. Likewise, at 95, if an undesired number of engine speed differences were greater than the maximum threshold, the air/fuel ratio of the fuel mixture may be enleaned less, or even enriched, at 103 before the engine speed tests are repeated. This is because an engine speed difference greater than the maximum threshold indicates the fuel mixture at 87 was too lean. Hence, the new air fuel ratio from 103, in this instance, is richer than when the prior engine speed tests were performed. This also can be repeated until a threshold number of engine speed differences are within the thresholds, with a different starting air/fuel ratio for each iteration of the process.

When a desired number of satisfactory engine speed differences (i.e. between the thresholds) occur at a given air/fuel ratio, that air/fuel ratio may be maintained for further operation of the engine. That is, the solenoid valve 8 may be actuated during normal engine operation generally in the same manner it was for the engine speed tests that provided the satisfactory results.

FIG. 8 shows a fuel mixture adjustment test series starting from a rich air/fuel ratio of about Lambda=0.7, and ending with an air/fuel ratio of about Lambda=0.855. In this series, the enleanment step was repeated several times until a desired number of engine speed differences within the thresholds occurred. That resulted in a chosen air/fuel ratio of about Lambda=0.855, and the engine may thereafter be operated with a fuel mixture at or nearly at that value for improved engine performance by control of the solenoid valve 8 or other mixture control device(s).

As noted above, instead of trying to find an engine speed difference (after changing the air/fuel ratio) that is as small as possible to indicate the engine peak power fuel mixture, the process may look for a relatively large engine speed difference, which may be greater than a minimum threshold. This may be beneficial because it can sometimes be difficult to determine a small engine speed difference during real world engine usage, when the engine is under load and the load may vary during the air/fuel ratio testing process. For example, the engine may be used with a tool used to cut grass (e.g. weed trimmer) or wood (e.g. chainsaw). Of course, the engine could be used in a wide range of applications. By using a larger speed difference in the process, the "noise" of the real world engine load conditions have less of an impact on the results. In addition, as noted above, there can be significant variances in cyclic speed during normal operation of at least some small engines making determination of smaller engine speed differences very difficult.

As noted above, the engine load may change as a tool or device powered by the engine is in use. Such engine operating changes may occur while the engine speed test is being conducted. To facilitate determining if an engine operating condition (e.g. load) has changed during the engine speed test, the engine speed may be measured a third time, a sufficient period of time after the air/fuel ratio is changed during an engine speed test to allow the engine to recover after the air/fuel ratio change. If the first engine speed (taken before the fuel mixture change) and the third engine speed (taken after the fuel mixture change and after a recovery period) are significantly different, this may indicate a change in engine load occurred during the test cycle. In that situation, the engine speed change may not have been solely due to the fuel mixture change (enleanment) during the engine speed test. That test data may either be ignored (i.e. not used in further calculation) or a correction factor may be applied to account for the changed engine condition and ensure a more accurate air/fuel ratio determination.

In one form, and as noted above, the mixture control device that is used to change the air/fuel ratio as noted above includes a valve 8 that interrupts or inhibits a fluid flow within the carburetor 4. In at least one implementation, the valve 8 affects a liquid fuel flow to reduce the fuel flow rate from the carburetor 4 and thereby enlean the fuel and air mixture delivered from the carburetor to the engine. The valve may be electrically controlled and actuated. An example of such a valve is a solenoid valve. The valve 8 may be reciprocated between open and closed positions when the solenoid is actuated. In one form, the valve prevents or at least inhibits fuel flow through a passage 120 (FIG. 1) when the valve is closed, and permits fuel flow through the passage when the valve is opened. As shown, the valve 8 is located to control flow through a portion of the fuel circuit that is downstream of the fuel metering assembly and upstream of a main fuel jet that leads into the fuel and air mixing passage. Of course, the valve 8 may be associated with a different portion of the fuel circuit, if desired. By opening or closing the valve 8, the flow rate of fuel to the main fuel jet is altered (i.e. reduced when the valve is closed) as is the air/fuel ratio of a fuel mixture delivered from the carburetor. A rotary throttle valve carburetor, while not required, may be easily employed because all fuel may be provided to the fuel and air mixing passage from a single fuel circuit, although other carburetors may be used.

In some engine systems, an ignition circuit 38 may provide the power necessary to actuate the solenoid valve 8. A controller 60 associated with or part of the ignition circuit 38 may also be used to actuate the solenoid valve 8, although a separate controller may be used. As shown in FIG. 3, the ignition circuit 38 may include a solenoid driver subcircuit 130 communicated with pin 3 of the controller 60 and with the solenoid at a node or connector 132. The controller may be a programmable device and may have various tables, charts or other instructions accessible to it (e.g. stored in memory accessible by the controller) upon which certain functions of the controller are based.

The timing of the solenoid valve, when it is energized during the portion of the time when fuel is flowing into the fuel and air mixing passage, may be controlled as a calibrated state in order to determine the normal air/fuel ratio curve. To reduce power consumption by the solenoid, the fuel mixture control process may be implemented (that is, the solenoid may be actuated) during the later portion of the time when fuel flows to the fuel and air mixing passage (and fuel generally flows to the fuel metering chamber during the engine intake stroke). This reduces the duration that the solenoid must be energized to achieve a desired enleanment. Within a given window, energizing the solenoid earlier within the fuel flow time results in greater enleanment and energizing the solenoid later results in less enleanment. In one example of an enleanment test, the solenoid may be energized during a brief number of revolutions, such as 30. The resultant engine speed would be measured around the end of this 30 revolution enleanment period, and thereafter compared with the engine speed before the enleanment period.

With a 4-stroke engine, the solenoid actuated enleanment may occur every other engine revolution or only during the intake stroke. This same concept of operating the solenoid every other revolution could work on a 2-stroke engine with the main difference being the solenoid energized time would increase slightly. At slower engine speeds on a 2-stroke engine the solenoid control could then switch to every revolution which may improve both engine performance and system accuracy.

It is also believed possible to utilize the system to provide a richer air/fuel mixture to support engine acceleration. This may be accomplished by altering the ignition timing (e.g. advancing ignition timing) and/or by reducing the duration that the solenoid is energized so that less enleanment, and hence a richer fuel mixture, is provided. When the initial carburetor calibration is rich (e.g. approximately 20-25% rich), no solenoid actuation or less solenoid actuation will result in a richer fuel mixture being delivered to the engine. Further, if the amount of acceleration or acceleration rate can be sensed or determined, a desired enrichment amount could be mapped or determined based on the acceleration rate. Combining both the ignition timing advance and the fuel enrichment during transient conditions, both acceleration and deceleration can be controlled for improved engine performance. Ignition timing may be controlled, in at least some implementations, as disclosed in U.S. Pat. No. 7,000,595, the disclosure of which is incorporated by reference herein, in its entirety.

Idle engine speed can be controlled using ignition spark timing. While not wishing to be held to any particular theory, it is currently believed that using a similar concept, fuel control could be used to improve the idle engine speed control and stability. This could be particularly useful during the end of transient engine conditions such as come-down. The combination of ignition and fuel control during idle could improve engine performance.

Ignition timing control is considered a fast response control method in that the engine speed or other engine parameter may change quickly when the ignition timing is changed. However, the controllable engine speed range is constrained by the maximum and minimum amount of ignition timing advance the engine can tolerate. Air/fuel mixture changes are considered a somewhat slower response control method in that the engine operating changes may be slower than with an ignition timing change. Combining the slower response air fuel mixture control with the faster response ignition control can greatly expand the engine speed control range, and this may be particularly useful, in at least some engines and applications, at engine idle or near idle operating speeds and conditions. Of course, the innovations disclosed herein are not limited to idle and near-idle engine operation.

As noted above, the range of engine speed control that may be achieved by ignition timing control (e.g. advancing or retarding ignition events) is confined to the combustible range of ignition advance. Practical limitations could be even narrower in any given engine application, around 20-30 degrees of ignition advance, to ensure proper engine performance such as acceptable acceleration, roll-out, come-down, etc. While most engines can experience performance benefits from ignition timing based idle engine speed control, it is possible to exceed the ignition control range which can negatively affect engine performance in at least some instances, such as when different fuel is used or the air density changes from altitude and temperature changes. Some of these changes or combinations of changes can effectively exceed the ignition timing idle speed control range resulting in the idle speed exceeding its specified set-point. To expand the effective idle engine speed control window the addition of fuel and air mixture control (i.e. changing the air/fuel ratio of the mixture delivered to the engine) can be combined with ignition timing.

In a combined control system, a desired threshold of ignition timing change may be established, and a desired engine idle speed threshold, likely set as a range of speed, may also be established. Idle engine speed outside of the engine idle speed threshold may first result in a change of the engine ignition timing. The ignition timing may be altered up to the ignition timing change threshold, and if the engine speed ends up within the engine idle speed threshold by only the change in ignition timing, nothing more needs to be done. Subsequent engine speed changes may be handled in the same manner. If, however, the ignition timing is altered up to the threshold ignition timing change and the engine speed is still outside of the engine speed threshold, then the fuel and air mixture ratio may be altered until the engine speed is within the threshold. This combination of ignition timing control and air/fuel mixture control can greatly expand the ability to control engine idle speed for all environmental conditions. Further, utilizing the faster response ignition timing control as the first measure to control engine idle speed enables more rapid engine speed control in many instances, and only when that is insufficient is the slower response fuel/air adjustment control implemented. This enables more rapid and responsive engine speed control.

Increases in spark advance (where the spark is the start of an ignition event) generally result in increases in engine speed and decreases in spark advance generally result in engine speed decreasing. Likewise since most small engine carburetors are initially set with a slightly rich air/fuel mixture (and slightly open throttle valve setting), increasing the air/fuel mixture ratio (which makes the air/fuel mixture leaner, for example from 9:1 to 11:1) will result in an engine idle speed increase and decreasing the air/fuel mixture (which makes the air/fuel mixture richer, for example from 13:1 to 10:1) will generally result in an engine speed decrease.

In a representative system, the ignition timing control threshold may be set at plus or minus four (4) degrees of the normal ignition timing, where the degrees indicate the angular engine position relative to TDC or some other reference position at which the ignition spark is provided. Once the ignition control threshold is exceeded on the high side (e.g. at +4°) the fuel mixture can then be leaned out to increase the engine speed while maintaining the ignition timing within the threshold, or even allowing a reduction in the magnitude of the ignition timing change from the nominal/normal ignition timing. Likewise, if the ignition timing advance is reduced below the low threshold (e.g. −4°) the air/fuel mixture can be richened to reduce the engine speed while maintaining the ignition timing within the threshold, or even allowing a reduction in the magnitude of the ignition timing change from the normal ignition timing.

Figure 9:
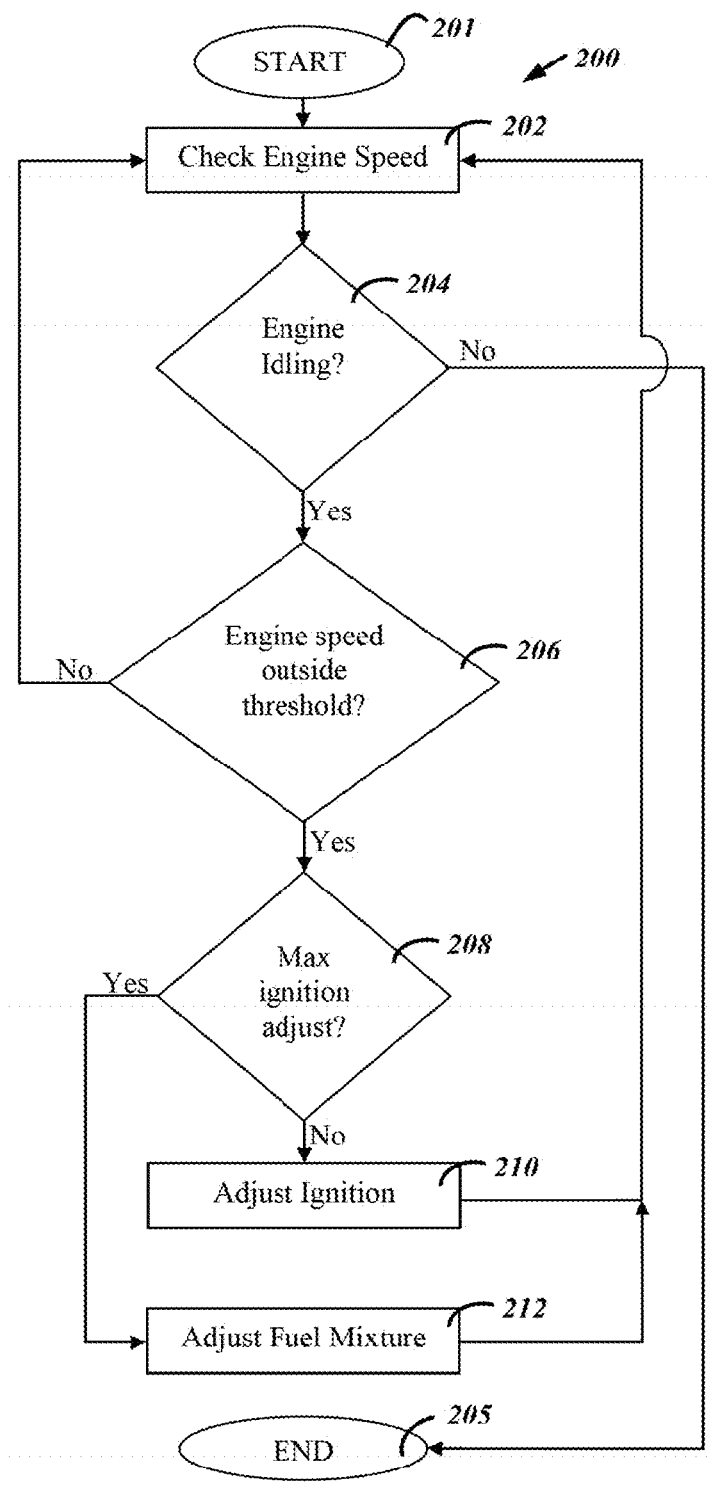
FIG. 9 is a flow chart of an example of an engine idle operation control process.

One representative control process 200 is generally shown in FIG. 9. The process starts at 201, the engine speed is checked at 202 and a determination is made at 204 as to whether the engine is idling or near enough to idle for the process. In this example, the process is used only for engine idle and near idle operation and other strategies may be used when the engine is not at or near idle, if desired. If the engine operation does not satisfy the first condition then the process may end at 205. If the engine operation satisfies the first condition, then it is determined in 206 whether the engine speed is within a desired range for idle or near idle operation. If the engine speed is within the threshold, then the process may be started over, to again check engine idle operation as desired. This check may be run at any desired periodic timing.

If the engine speed is outside of the threshold, then it is determined at 208 whether the maximum ignition timing adjustment has already been made (i.e. if the ignition timing is within a threshold range). If the ignition timing is within its threshold, then the ignition timing may be adjusted at 210 up to its threshold in one or more iterative steps or otherwise, as desired. If addition ignition timing is not available within that threshold, then the process continues to 212 where the air-fuel mixture may be adjusted to provide a desired engine speed change. The process may continue to check engine speed periodically (such as every revolution or at longer intervals) or the process may end. The process may be run again, as desired, to monitor and change as needed the engine idle speed operation.

Additional control calibration techniques can be applied to further refine the idle speed stability and accuracy. Things like looking statistically at the number of revolutions or time the ignition timing has exceeded the threshold or the standard deviation of the ignition timing value exceeding the threshold value can further refine the strategy. Among other things, the normal ignition timing may be altered, and or the ignition timing control threshold adjusted, depending upon actual engine operating data.

By knowing which phase the engine is operating on the total electrical power consumption used by the engine can be greatly reduced when only consuming electrical power every other revolution. This is particularly beneficial at low engine speeds when the power generation capacity of the ignition module is often less than the required power to control the engine every revolution (ignition timing and secondary electrical loads such as an electronic carburetor).

Four stroke engines have four distinct cycles; intake, compression, power and exhaust. These four cycles take place over two engine revolutions. Beginning at TDC the intake cycle begins and at the subsequent BDC the intake cycle ends and the compression stroke begins. At the next TDC the compression cycle is completed and the power stroke begins. At the next BDC, the power cycle is completed and the exhaust stroke begins. Hence, the intake and compression cycles occur in one engine revolution and the power and exhaust cycles occur in the next engine revolution. The time for the engine revolution including the intake and compression cycles is greater (slower engine speed) than the time for the engine revolution power and exhaust cycles (faster engine speed). This is largely due to losses from intake pumping and compression resulting in the engine speed decreasing during the intake and compression engine revolution. Conversely during the power or combustion cycle the engine speeds up due to the increase in pressure developed during a combustion event.

The difference in speed is detectable with the use of a microprocessor clock such as is found in digital ignition modules. Measuring the time for an engine revolution may be performed on small engines that have a single magnet group mounted on/in the flywheel. As the flywheel magnet rotates past the ignition module an electrical signal is produced that can be used as a crankshaft angle measurement. Every engine revolution produces one electrical signal therefore the time between these signals represents the average engine speed for a single revolution. Further refinement of this concept can be done with multiple magnet groups thereby allowing detection of the individual engine cycles rather than the just the engine revolution that produces power. This also will result in greater crankshaft angular resolution (ability to determine crankshaft position) within a single engine revolution.

Since there can be a large amount of cyclic variation from revolution to revolution, it sometimes can be difficult to guarantee the determination of the engine revolutions (e.g. the revolution that corresponds to the intake and compression cycles, or the revolution that corresponds to the power and exhaust cycles).

To improve the accuracy of phase detection, a process that determines engine speed for a number of engine revolutions may be used. An example of such a process is described below. At engine startup, an ignition spark is provided every engine revolution, as is common, and a threshold number of engine revolution speeds or time is recorded. In one example, the time for each of 20 engine revolutions is recorded, and this data may be recorded in any suitable manner on any suitable device, such as but not limited to a First-In-First-Out (FIFO) buffer. In this way, the last 20 engine revolution times/speeds are stored. Of course, the data for more or fewer engine revolutions may be used and 20 is just one example.

After a threshold number of engine revolutions, for example chosen to permit the engine speed to stabilize, the recorded engine revolution data is checked to see if an alternating pattern has occurred, for example where every other revolution is longer than the intervening revolutions. The second threshold may be any desired number of engine revolutions, or it may simply be a time from engine start or other engine event. In one example, the second threshold is 12 revolutions although other numbers of revolutions can be utilized as desired.

The process may look at any number of engine revolution times/speeds to determine if a desired pattern has occurred. For example, the process may look at all 20 recorded engine revolution times to determine if the desired timing pattern has occurred. And the process may continue until 20 consecutive engine revolutions show a desired timing pattern, e.g. every other revolution being shorter or longer than the intervening revolutions. This analysis may be conducted for a given number of engine revolutions after engine starting, or some other chosen engine event. For example, in one form, this analysis of the last 20 revolutions occurs for only the first 50 engine revolutions after engine starting. This relatively short window may be chosen to reduce the likelihood that the engine operating will change (for example, due to throttle valve actuation) which would cause an engine speed change not due to the various engine cycle effects.

Figure 10:
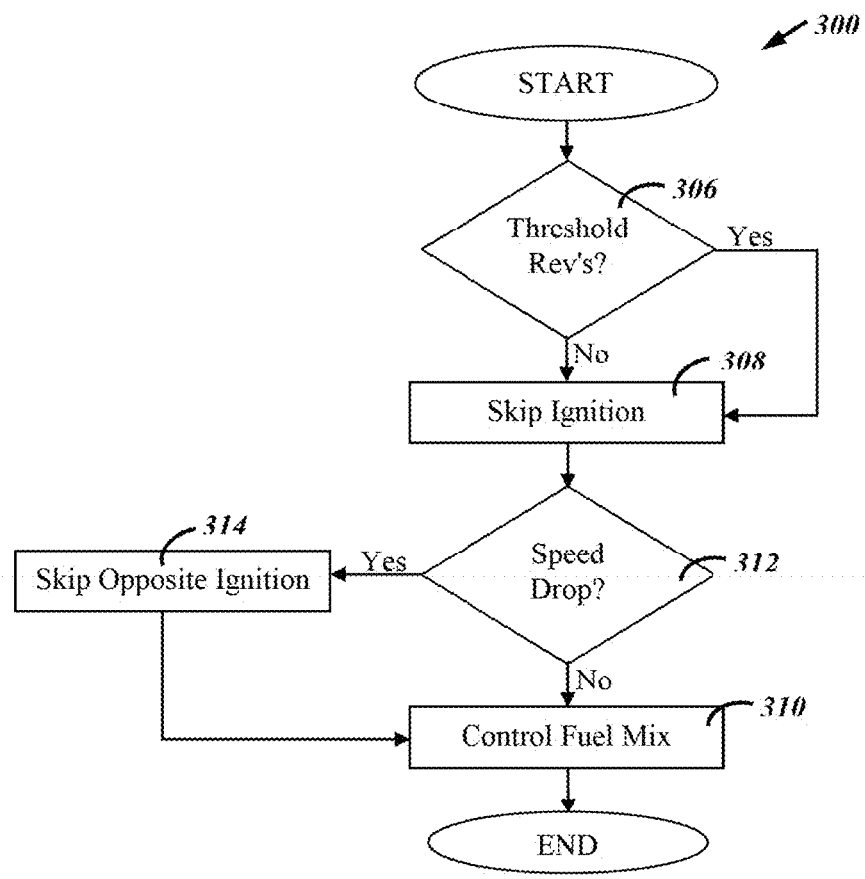
FIG. 10 is a flow chart of an example of an engine ignition and/or fuel control process.

A general description of the process 300 is shown in FIG. 10. At 306 it is determined if the desired number of consecutive (or perhaps a threshold percentage of) engine cycles indicates a desired pattern of engine speed changes within a desired window of engine revolutions, then the process may continue to 308 wherein an ignition event is skipped every other revolution. In one form, the ignition event is provided only during the engine revolution including the power cycle and an ignition spark is not provided during the engine revolution including the intake and compression cycles. This avoids wasting an ignition spark and the energy associated therewith. Also, fuel may be provided from the carburetor or other fuel supplying device only during the correct engine revolution or cycle, e.g. the engine revolution including the intake and compression cycles, which is noted at 310. In this way, more efficient engine operation can be achieved to conserve electrical energy, conserve fuel and reduce engine emissions.

When ignition events are skipped, a check of the engine speed can be performed at 312 to ensure that the engine speed is not adversely affected, which could mean that the incorrect spark is being skipped. For example, if after a couple of skipped ignition events the engine speed decreases beyond a threshold, this could mean that the ignition spark needed for combustion was skipped. If an engine speed decrease is detected, the ignition spark may be provided every engine revolution at 314, or the skipped spark may be changed to the other engine revolution and a check of the engine speed performed to see if the ignition spark is being provided during the correct engine revolution.

The engine speed check may occur as the revolutions are recorded, or the check may look to previously recorded data for engine revolutions. In the example below, the most recent engine revolution recorded is rpm[0], the previous revolution is rpm[−1], the revolution before that is rpm[−2], etc. For the engine cycle/revolution detection to be considered successful, then the recorded revolution data needs to satisfy: (rpm[0]>rpm[−1]) AND (rpm[−1]<rpm[−2]). If satisfied, then the review continues to (rpm[−2]>rpm[−3]) AND (rpm[−3]<rpm[−4]). And so on until a threshold number of revolutions satisfy the pattern, where the threshold number of revolutions needed can be any number up to and including all of the revolutions stored on the buffer. When the threshold number of revolutions satisfies the pattern, the system moves to the next phase which is to skip ignition events and provide fuel in accordance with the determined engine revolutions and the engine cycles occurring during these revolutions.

If the desired number of consecutive engine revolutions does not indicate a desired pattern of engine speed changes within a desired window of engine revolutions (a "no" response at 306), then the ignition event may be terminated or not provided every other engine revolution for a determined number of engine revolutions. While in FIG. 10 the "skip ignition" step is shown as 308 in either determination from 306, where the threshold revolution criteria is satisfied at 306, the "skip ignition" occurs based on this data, and when the criteria is not satisfied, the skip ignition occurs based on something else. When to skip the spark may be chosen based upon an analysis of the recorded revolutions (e.g. if more revolutions are slower than the others, on an every other revolution basis, then this information may be used for the initial spark skip even though the full threshold of revolutions did not satisfy the set rule) or the next scheduled or any subsequent spark may be skipped without regard to the recorded data. In one example, an ignition event is skipped every other engine revolution for four engine revolutions. If the engine speed does not decrease beyond a threshold after the skipped ignition events (as determined at 312), then the system considers that the ignition events were skipped during the correct engine revolutions. Subsequent ignition events may also be skipped during corresponding engine revolutions, and the fuel supply may also be controlled based on this timing. If, however, the engine speed does decrease beyond a threshold after the skipped ignition events, then the ignition events were skipped during the incorrect engine revolutions. Subsequent skipped ignition events can then be set to the other engine revolutions and the fuel supply to the engine may also be controlled based on this timing. Subsequent checking of engine speed may also be used to ensure the skipped ignition events are not adversely affecting engine speed.

Additionally statistical analysis of the alternating pattern can be performed to provide an accurate determination of engine cycle/phase when there are larger amounts of cyclic variation or small differences in cyclic engine speed. This type of analysis can be done to effectively reduce the determination time required.

In general, most small engines idle run quality is best when the ignition timing is slightly retarded and the air/fuel mixture is near optimum. But during these conditions most small engines will also experience performance problems during fast transient accelerations and decelerations. To help alleviate this issue, both rapidly advancing the ignition timing and enriching the fuel mixture for several revolutions can improve engine performance. The difficulty in doing so on small low cost engines stems from not having sensors to indicate that a rapid load change is starting to occur, such as a throttle position sensor or a manifold pressure sensor.

This disclosure describes how using the raw ignition signal along with controlling ignition timing and fuel mixture on a cyclic basis can improve these fast transient conditions. Controlling ignition timing based on transient changes in the ignition signal has been described in U.S. Pat. No. 7,198,028. Use of these detection methods can now be applied to rapidly change the ignition timing and also rapidly change the fuel mixture via an electronic fuel control actuator in the carburetor, thereby improving the acceleration and deceleration qualities of the engine.

One example of a fuel control actuator includes a solenoid that blocks at least a portion of the fuel flow during the engine intake cycle. As an example, if the blocking action normally occurs at the end of the intake cycle, the fuel mixture can be leaned-out by activating a normally open solenoid at an earlier crank angle position, in other words by blocking at least some fuel flow for a longer duration of the intake cycle. Many possible calibration configurations exist but an example might be activating the solenoid at 200° ATDC results in a Lambda value of 0.78 (rich) and a solenoid activation angle of 145° ATDC results in a Lambda value of 0.87 (9% leaner). Therefore, changing the solenoid activation angle to a richer Lambda setting (less fuel flow blocking) during transient accelerations can improve the engine response and performance. This enriching of the mixture during acceleration can be tailored up to a full rich setting (no solenoid activation, so no fuel flow blocking) and also controlled for any number of engine revolutions after the detection of a transient change has occurred. Additionally, the fuel flow control can be optimized in any number of ways, for example, running full rich (no fuel flow blocking) for a certain number of revolutions and decreasing the richness of the fuel mixture (i.e. increasing the fuel flow blocking) at a set rate for a certain number of additional revolutions. In just one of nearly limitless examples, no fuel flow blocking may be provided for 3 revolutions and the richness may be decreased (i.e. increased fuel flow blocking) for 10 revolutions. Many additional options for the actual control calibration exist. Likewise control of the deceleration performance can be improved through similar control techniques, and in at least some implementations, the richness of the fuel mixture can be increased (i.e. decreasing the fuel blocking) during the deceleration event. During acceleration, the ignition timing may also be advanced up to its maximum advancement, which may be a predetermined and/or calibrated value relative to a nominal or normal ignition timing for a given engine operating condition. During deceleration or come-down periods, the ignition timing may be retarded for a desired time (such as, but not limited to, a certain number of revolutions). When to alter/retard/advance the ignition timing and by how much to alter the timing may be predetermined or calibrated values. In this way, the ignition timing and fuel control may be adjusted together or in series during acceleration and deceleration of the engine.

Figure 11:
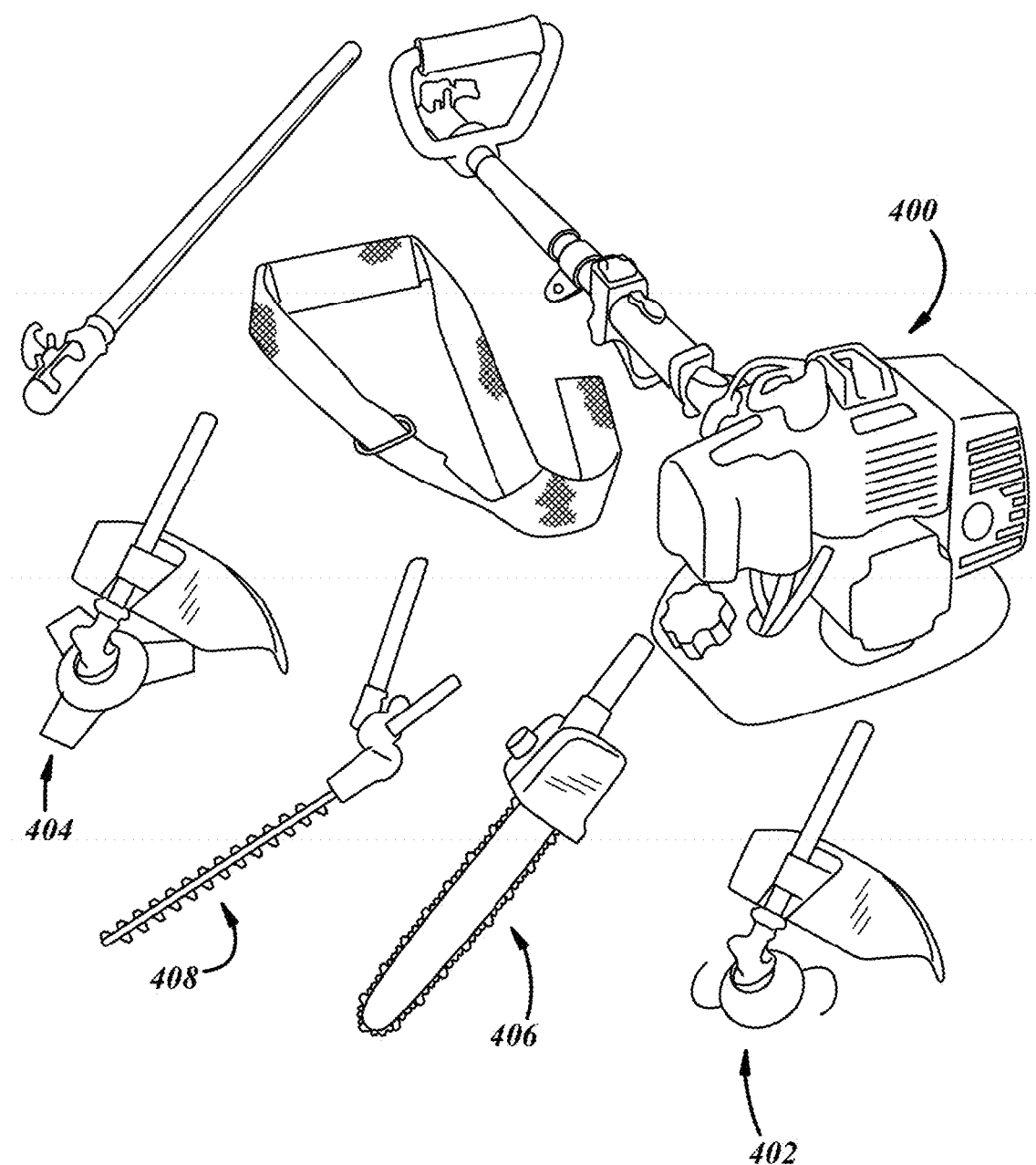
FIG. 11 shows an engine powered device with a plurality of interchangeable loads or tools that may driven by the engine.

They cyclic engine speed variation may also be used to determine other engine operating parameters, such as the type of tool or load being driven by the four stroke engine. In one example, an engine powered device, shown as a multi-tool gardening or landscape device 400, such as shown in FIG. 11, may be used with a string cutting tool 402 including one or more strings, a blade-type cutting tool 404 including one or more blades, a saw 406 and a hedge trimmer 408. Other tools or loads may be connected to and driven by the engine, as desired. The remainder of this description will focus on the string tool and blade tool, although the disclosure may be applicable to different tools or engine attachments/loads.

In use, the string tool tends to provide a smoother pattern of alternating engine revolutions that alternate between faster and slower revolutions (e.g. in a four stroke engine) than the blade tool. An engine driving a string tool may provide relatively long sequences of alternating faster and slower revolutions. This may be due at least in part to the increased mass and moment of inertia of the blade(s) compared to the lighter string(s) which cause an engine driving the blade to operate less smoothly or steadily. This difference in patterns between the string and blade type cutting tools is more easily seen on a dynamometer or the like, but is more difficult to determine in normal operation and while the tool is under load (e.g. cutting grass or weeds).

In at least certain implementations, the engine speed may be determined each revolution and compared to the prior revolution. The engine speed each revolution (e.g. the length of time for each revolution) is checked over a certain number of revolutions to determine how many revolutions fit the expected pattern of alternating faster and slower revolutions. Based upon this information, an indicator may be developed that relates to the number of revolutions that fit the expected pattern. This indicator may be a simple count of the number of revolutions that fit the pattern over a given number of revolutions, or the number of revolutions that do not fit the pattern over a given number of revolutions, or some combination of the two (e.g. a ratio), or some pattern within the given number of revolutions (for example without limitation, a certain number of revolutions in a row that correspond to the expected pattern, followed by one or more revolutions that do not correspond to the expected pattern, followed by a certain number that do correspond to the expected pattern).

By way of one non-limiting example, the indicator may be developed by examining the most recent thirty-two engine revolutions. Of course, thirty-two is just one example and any number of revolutions could be used with one contemplated range of revolutions that may be used being between sixteen and five hundred and twelve, and a factor of two need not be used. After the engine has been running for at least thirty-two revolutions, each new revolution will replace the oldest of the thirty-two revolutions being tracked, and so on, for a running total of thirty-two revolutions. In at least some implementations, each revolution within the thirty-two revolutions being tracked at any given time that does not meet the expected pattern is counted and an accumulated total or tally of such revolutions is maintained over the thirty-two revolutions being tracked. The indicator is developed as a function of the number of revolutions that are counted in this manner. The indicator may be the same as the actual number of revolutions that were counted, or the indicator may be any assigned value that corresponds to the number of revolutions counted. For example, the indicator may include a scale of 1 to 10 where a 10 indicates a high number of counted (i.e. nonconforming) revolutions corresponding to rough or inconsistent engine operation, and a 1 indicates a very low number of counted revolutions corresponding to smoother and more desirable or consistent engine operation.

As noted above, at least in certain engines with certain blade-type cutting tools, the engine operation is not as smooth or consistent as it is with the same engine driving a string tool. Hence, in the example described above, a higher indicator number is expected when a blade cutting tool is used than when a string cutting tool is used. For a given engine, at a certain engine speed, multiple discrete engine speeds or over a range of engine speeds, typical indicator values can be determined and stored, and this can be done on a dynamometer or other test equipment, or in use of the particular device, for example in a test where actual or simulated grass or weeds are cut.

Representative indicator values from such tests or calibrations at any engine speed, at different engine speeds, or over a range of engine speeds may be stored in memory. The memory may be accessible by a processor (such as the ignition control microprocessor described above) during use of the device for comparison against actual indicator values determined during actual use of devices. Actual indicator values obtained in use of the engine can then be compared against stored values to determine if the engine is being used with a blade cutting tool or a string cutting tool (or whatever two different loads a particular device might have, not limited to weed trimmers). A smoothing average of a certain number of cycles (e.g. 65 revolutions) may be used to reduce the variability in the indicator value, such as that which might occur during normal cyclic variation in engine operation, and which is not necessarily attributable to the load/tool being driven by the engine.

The determination of the operating mode for or load on the device (in the example being discussed, whether a blade tool or string tool is used on a weed trimmer) can be used to aid in conducting the engine speed tests and air/fuel ratio adjustments disclosed herein. In the weed trimmer example, the greater mass and rotational inertia of the blade cutting tool might cause an engine driving a blade cutting tool to be somewhat slower to respond to changes in the air/fuel ratio. Hence, when it is determined that the engine is driving a blade cutting tool, more time might be allowed to elapse after an air/fuel ratio change (more time than might be needed with a string cutting tool) to permit the engine operation to stabilize under the new conditions. This can improve the air/fuel ratio adjustment process and prevent the less stable and slower to respond engine operation that results from the engine driving a blade cutting tool from erroneously affecting the results of the engine speed test and related processes. In other words, if sufficient time were not permitted to allow the engine driving a blade cutting tool to adjust to the new operating conditions, the less stable engine operation may result in a false engine speed test result and cause an incorrect air/fuel ratio adjustment (e.g. an enleanment or enrichment of incorrect magnitude).

Figure 12:
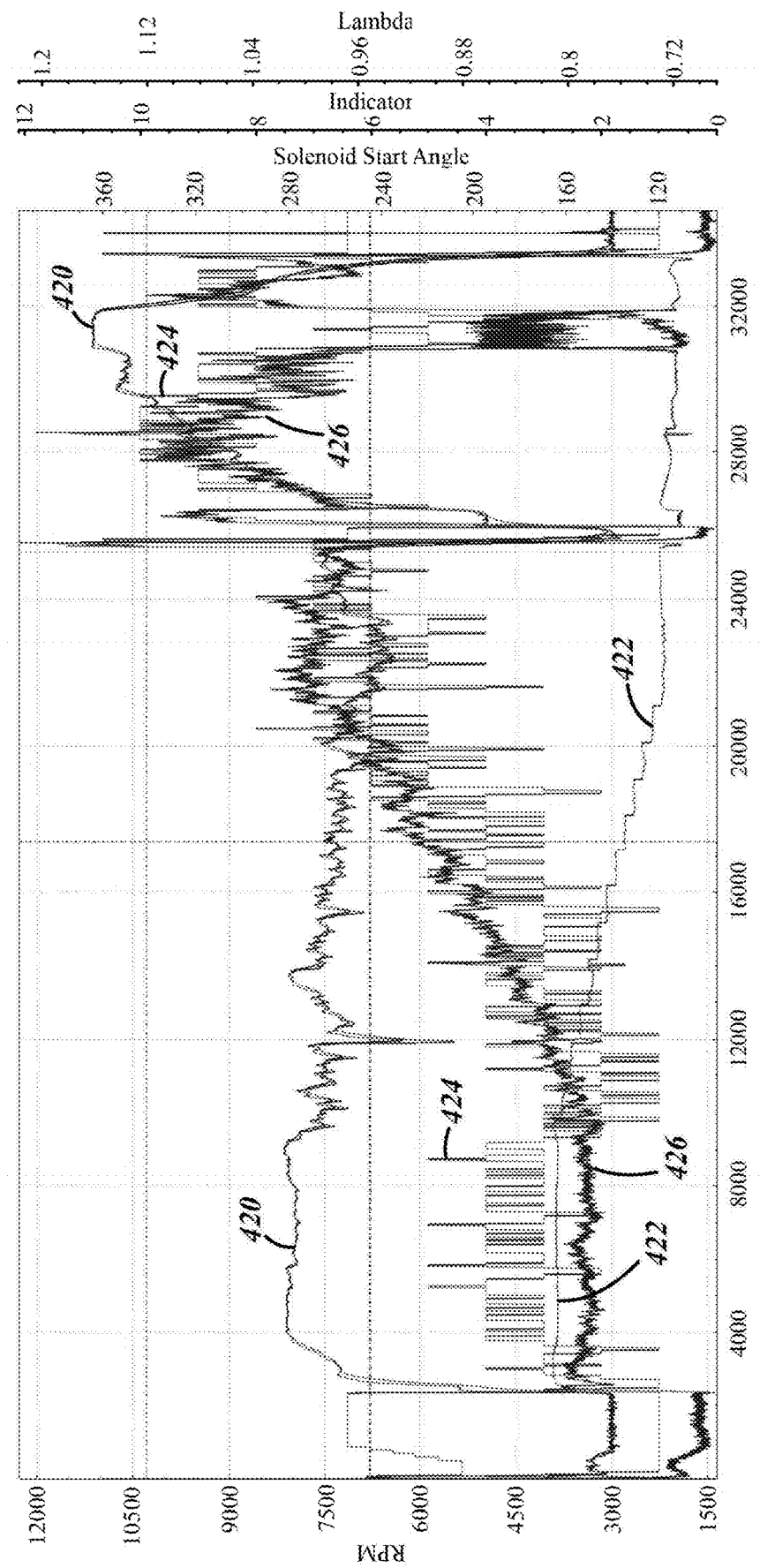
FIG. 12 is a graph of various engine parameters in use of a small engine weed trimming device utilizing a string as the trimming tool.

FIG. 12 is a graph of various engine operating parameters and an indicator value during an engine test, in other words, not during real world operation of the device. The device being tested was a weed trimmer equipped with a string tool driven for rotation by the engine. The number of engine revolutions is plotted along the x-axis (from zero to 35,000 revolutions). Along the y-axis engine speed in rpm is shown by line 420, solenoid start angle by line 422, the indicator value by line 424 and the lambda value by line 426. The solenoid start angle indicates the degrees after TDC at which the solenoid is actuated to alter the air/fuel ratio. A lower or decreasing start angle causes enleanment and an increasing or larger start angle causes enrichment of the air/fuel mixture.

During this test, the engine was at an idle speed of about 3,000 rpm from zero revolutions until about 2,400 revolutions. For starting and warming up of the engine at idle, the solenoid start angle was increased from about 210 degrees to about 250 degrees and an already rich fuel mixture (lambda about 0.72) was enriched (lambda about 0.7). Then the engine speed was increased to about 8,000 rpm between 2,400 revolutions and about 4,000 revolutions, and at this time, the engine was not under any operating load (e.g. string was not cutting weeds or grass at this time). At 2,400 revolutions, the solenoid start angle was reduced to about 160 degrees which enleaned the air/fuel mixture to a lambda value of about 0.78. This solenoid start angle was maintained until about 9,500 revolutions had occurred. At about 9,000 revolutions, the tool began to cut grass and weeds and the engine was operating under load. At this time, the solenoid start angle was reduced about once every thousand revolutions until about 21,000 revolutions had occurred and the start angle was at about 120 degrees. This enleaned the fuel mixture from a lambda of about 0.78 to about 1.0. During this time, engine speed reduced from about 7,500 rpm to about 7,000 rpm. At about 25,500 to 26,000 revolutions, the engine speed was decreased to idle, and the solenoid start angle was greatly increased to provide additional fuel to support the comedown event (lambda dropped to about 0.7 during the comedown event). At about 26,000 revolutions until about 32,000 revolutions, the engine was accelerated to about 11,000 rpm, and the solenoid start angle was reduced back to about 120 degrees, and then further over time to about 110 degrees to enlean the air/fuel mixture during acceleration, and lambda varied between about 0.96 and 1.1. In this test, the solenoid start angle was increased between 30,000 and 32,000 revolutions to enrich the air/fuel mixture. Finally, the solenoid start angle was reduced back to about 120 degrees before being increased at about 34,000 revolutions to support another comedown event after which the test ended.

The graph of FIG. 12 shows that the indicator value tracks the lambda value fairly well. Between lambda values of about 0.78 and 0.88, the indicator value is generally between about 2 and 4. Leaner fuel mixtures (lambda above 0.88) resulted in a higher indicator value which, in this example, means that the engine was running less smoothly, with more revolutions that did not meet the expected pattern. For example, in this test, a lambda value of about 0.94 resulted in an indicator value of about 6 and a lambda value of between about 1.04 and 1.13 resulted in an indicator value between 8 and 10.

Figure 13:
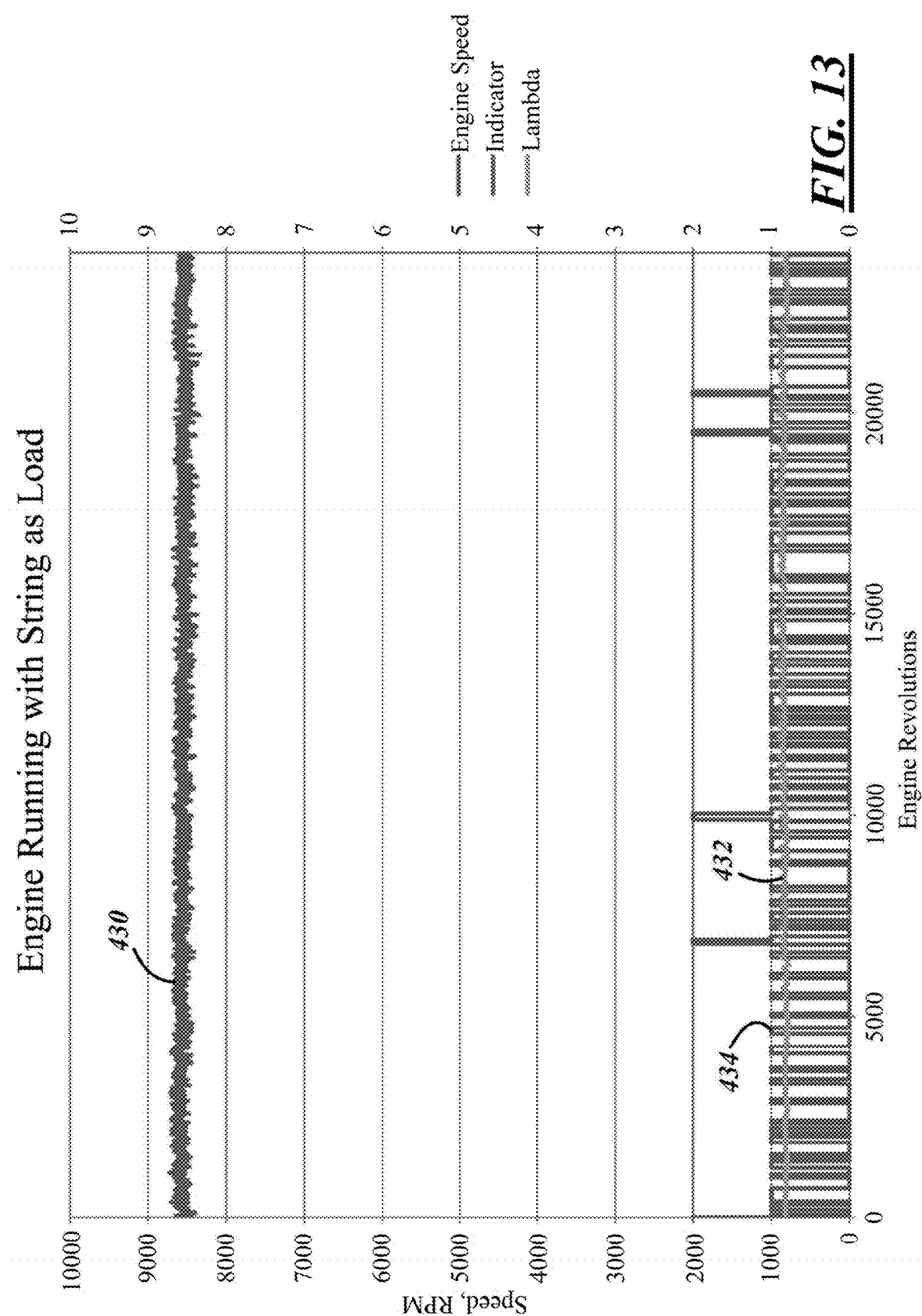
FIG. 13 is a graph of an indicator value and lambda as a function of engine speed and engine revolutions for an engine driving a string tool.
Figure 14:
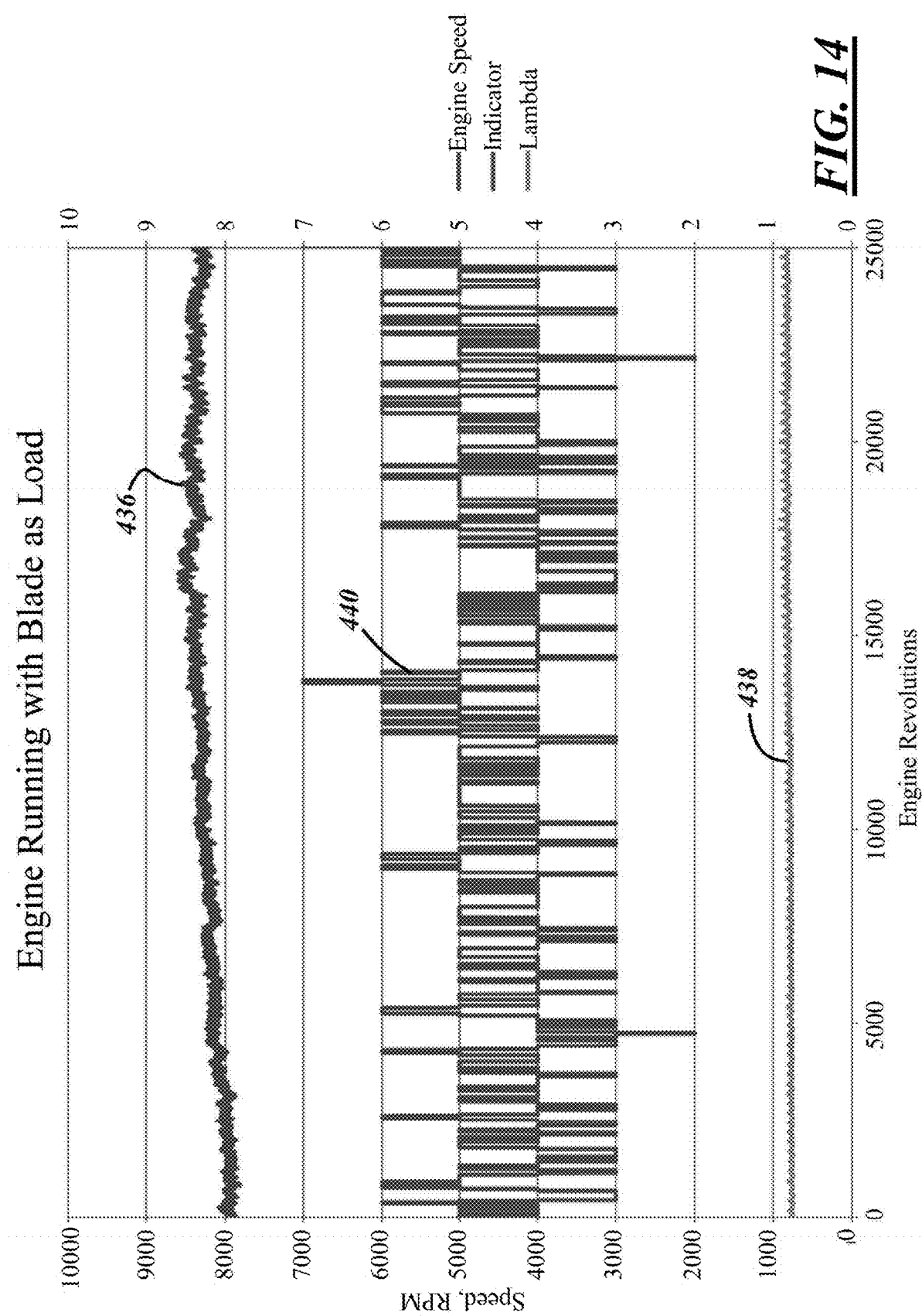
FIG. 14 is a graph of an indicator value and lambda as a function of engine speed and engine revolutions for an engine driving a blade tool.

FIGS. 13 and 14 compare indicator values between an engine driving a string tool and an engine driving a blade tool, where lambda and engine speed are generally constant. FIG. 13 relates to an engine driving a string tool with the engine running at about 8,500 rpm (engine speed is shown by line 430) with a fuel mixture at lambda 0.8 to 0.9 (shown by line 432). The indicator value is between 0 and 1 (shown by line 434) which indicates that the engine is running very smoothly with a low number of revolutions that do not match the expected pattern of alternating faster and slower revolutions. FIG. 14 relates to an engine driving a blade tool with the engine running at about 8,000 to 8,500 rpm (line 436) and also with a fuel mixture at lambda 0.8 to 0.9 (line 438). In this example, the indicator value (line 440) ranges between 3 and 6 and the engine speed is less steady or consistent than with the string tool. The difference in the indicator values of the engine driving the blade tool versus the engine driving the string tool are readily apparent. Thus, the indicator value can be used to determine the type of tool being driven by the engine, as noted above. This determination can, in turn, allow better control of the engine operating condition by, for example, accommodating slower reaction times for an engine driving a blade tool. Of course, as noted above, the string and blade tools for a weed trimmer are just one example for use of the system described herein. The system could be used on or with other tools that may be used to drive different tools or different loads, or where the engine may experience a different load in use (including, but not limited to, blades of different size or weight), for example, lawn tractors, generators or rototillers.

Further, the indicator and methods described herein could be used to determine when the air/fuel mixture is or is almost too lean, in other words, at or near a "lean limit". When the fuel mixture is at or near its lean limit (for some engines this is at lambda 1 or above) further enleanment may be reduced or avoided. Here, when the engine is at or near its lean limit may be determined as a function of the indicator. An indicator value threshold may be implemented where an indicator level above a certain level is indicative that the engine is running too rough for further enleanment. A rate of change of the indicator level in response to a series of enleanments may be used to determine a lean limit, an amount of variability in the indicator for a given air/fuel ratio over time might also be used. This might provide a low cost alternative to using a lambda sensor, even a narrow-band lambda sensor.

A non-limiting example of a lean limit routine implementation in a 4-stroke single cylinder engine is to examine the pattern of the engine speed during the intake and exhaust strokes over 32 revolutions of the crankshaft to determine how many of the 16 pairs of intake and exhaust strokes do not meet the normal pattern (intake stroke has a lower speed [rpm] than its immediately preceding exhaust stroke) and thus is an outlier. If half or more of these pairs do not follow the normal pattern (for example 8-10 of the 16 pairs are outliers) the engine has reached or exceeded its lean limit (usually at about $\lambda \geq 1$) and the fuel to air ratio is rapidly enriched, such as by about 5%. This routine may be continuously repeated to monitor, and if need be, enrich the fuel to air ratio of the engine to minimize or avoid engine operation with an exceedingly lean fuel to air ratio. As skilled persons know, prolonged engine operation with an excessively lean fuel to air ratio at high engine speeds (such as greater than 6000 rpm) will result in engine overheating and sometimes catastrophic failure (seizure), and at idle engine speed, stalling or stopping of the engine.

In at least some implementations, a method of distinguishing between two loads being driven by an engine may include the steps of:

determining engine speed at defined intervals;

comparing a second engine speed against a previously determined first engine speed;

determining if the second engine speed fits an expected pattern of engine speeds; and counting either the number of incidents where the second engine speed does not fit the expected pattern, or the number of incidents where the second engine speed does fit the expected pattern, or some combination of these two.

The method may be used with a four stroke engine and the defined interval may be one engine revolution. In the method, the time or speed of each engine revolution may be compared to the time or speed for the immediately prior engine revolution and the expected pattern includes alternating faster and slower revolutions. The method may also include the step of tallying all counted incidents over a predetermined number of engine revolutions, as well as the step of comparing the tally against stored data, where the stored data includes information relating to at least two engine loads, to determine which of the engine loads is being driven by the engine based on the tally comparison.

Figure 15:
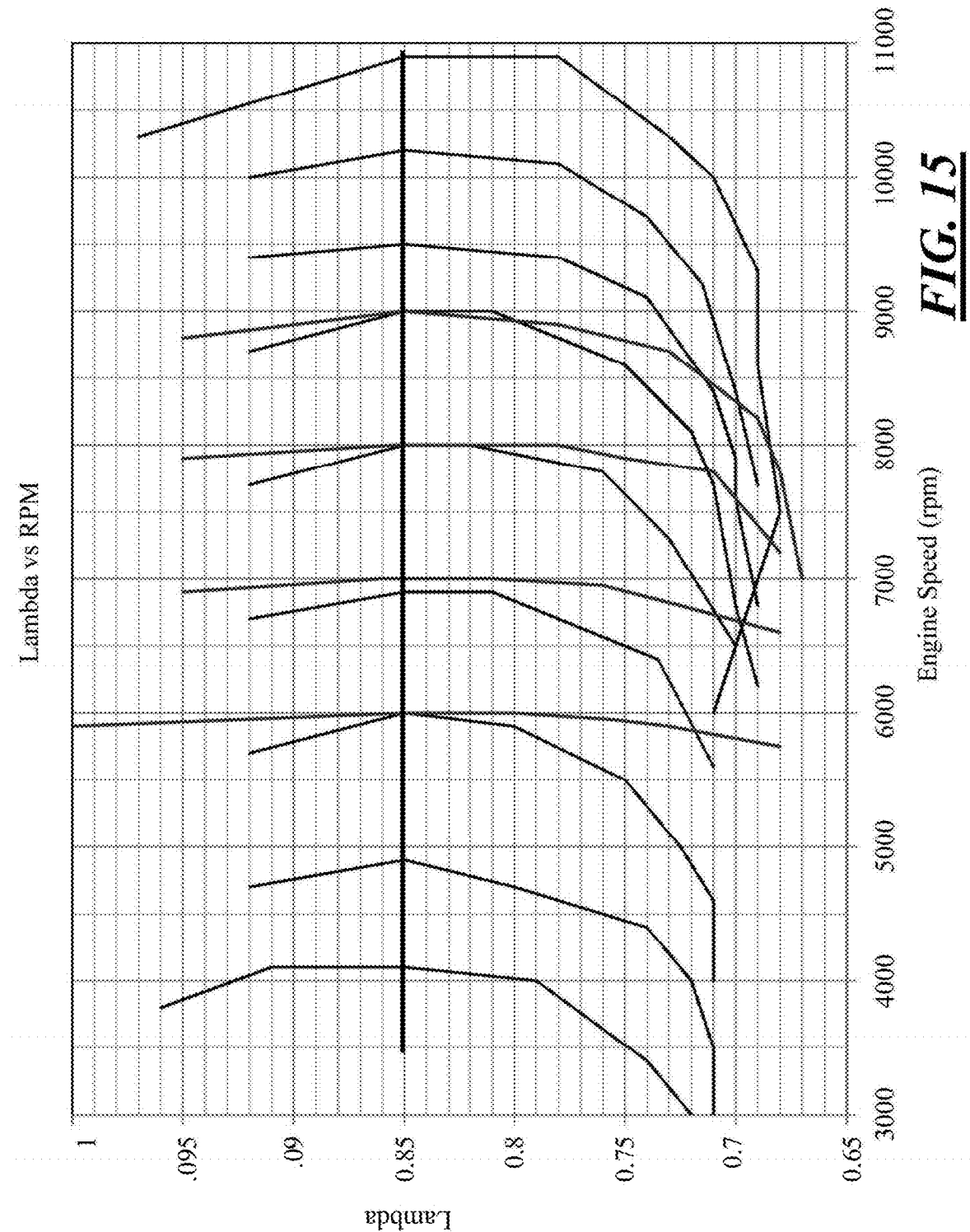
FIG. 15 is a graph of curves of lambda versus engine speed for a four stroke single cylinder small displacement engine.

FIG. 15 illustrates lambda versus RPM curves for a spark ignited gasoline powered four stroke engine with a displacement of 25 cubic centimeters ($cm^3$). This is a single cylinder engine with a diaphragm carburetor 4 of the type shown in FIG. 1 which includes a mixture control device 8, such as a normally open solenoid valve, an ignition system 10, control system 14, and a control circuit such as the control circuit 38 with a microcontroller 60. This engine was designed to be used on a lawn trimmer which may have a working head such as a string trimmer or a rotary blade trimmer. This engine may have a peak power output in the range of about 6,000 rpm to 11,000 rpm with a lambda air-to-fuel ratio of substantially 0.85.

Figure 16A:
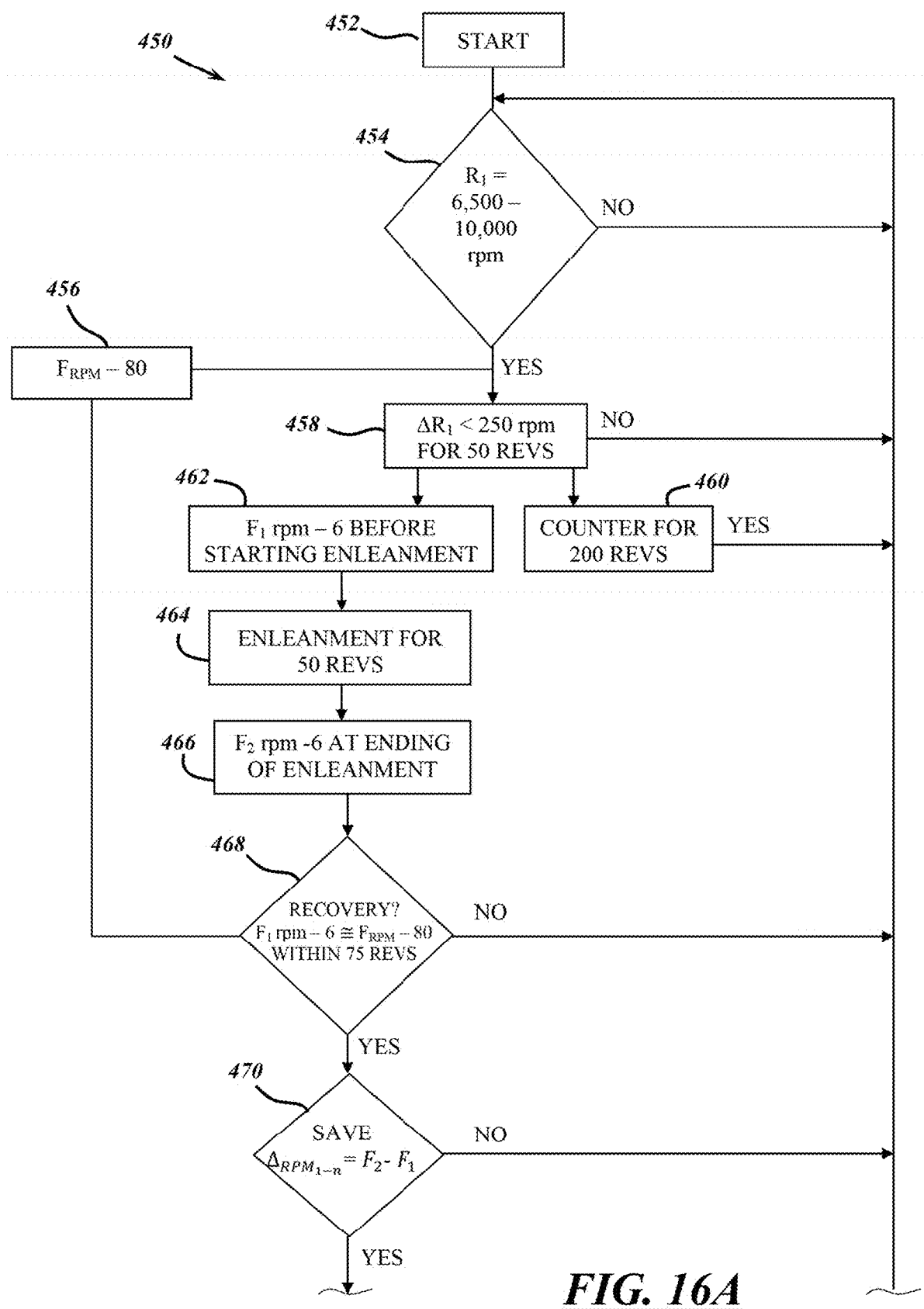
FIG. 16A is an initial part of a flow chart for an engine fuel control process.
Figure 16B:
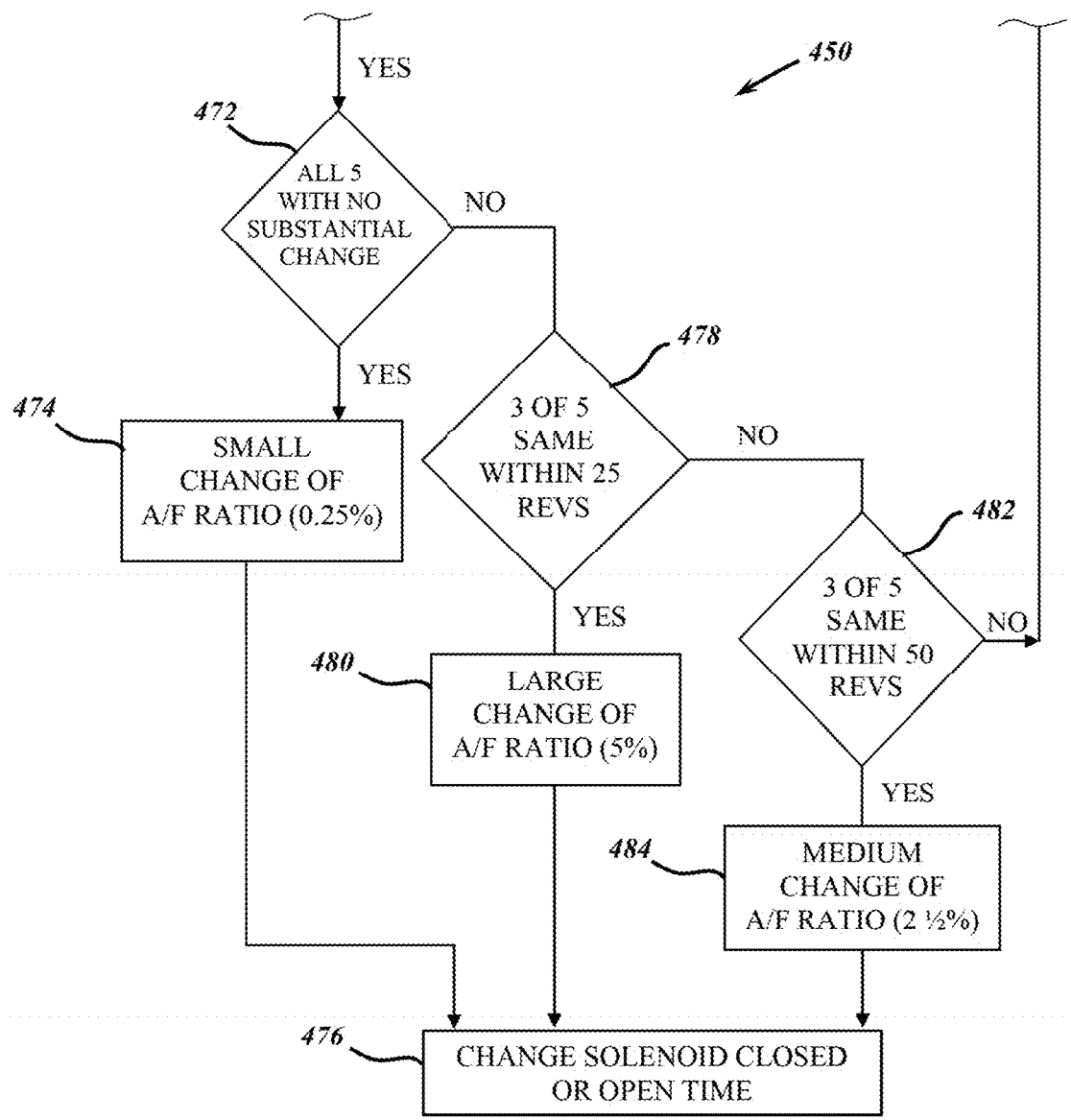
FIG. 16B is the rest of a flow chart of FIG. 12A for the engine fuel control process.
Figure 17:
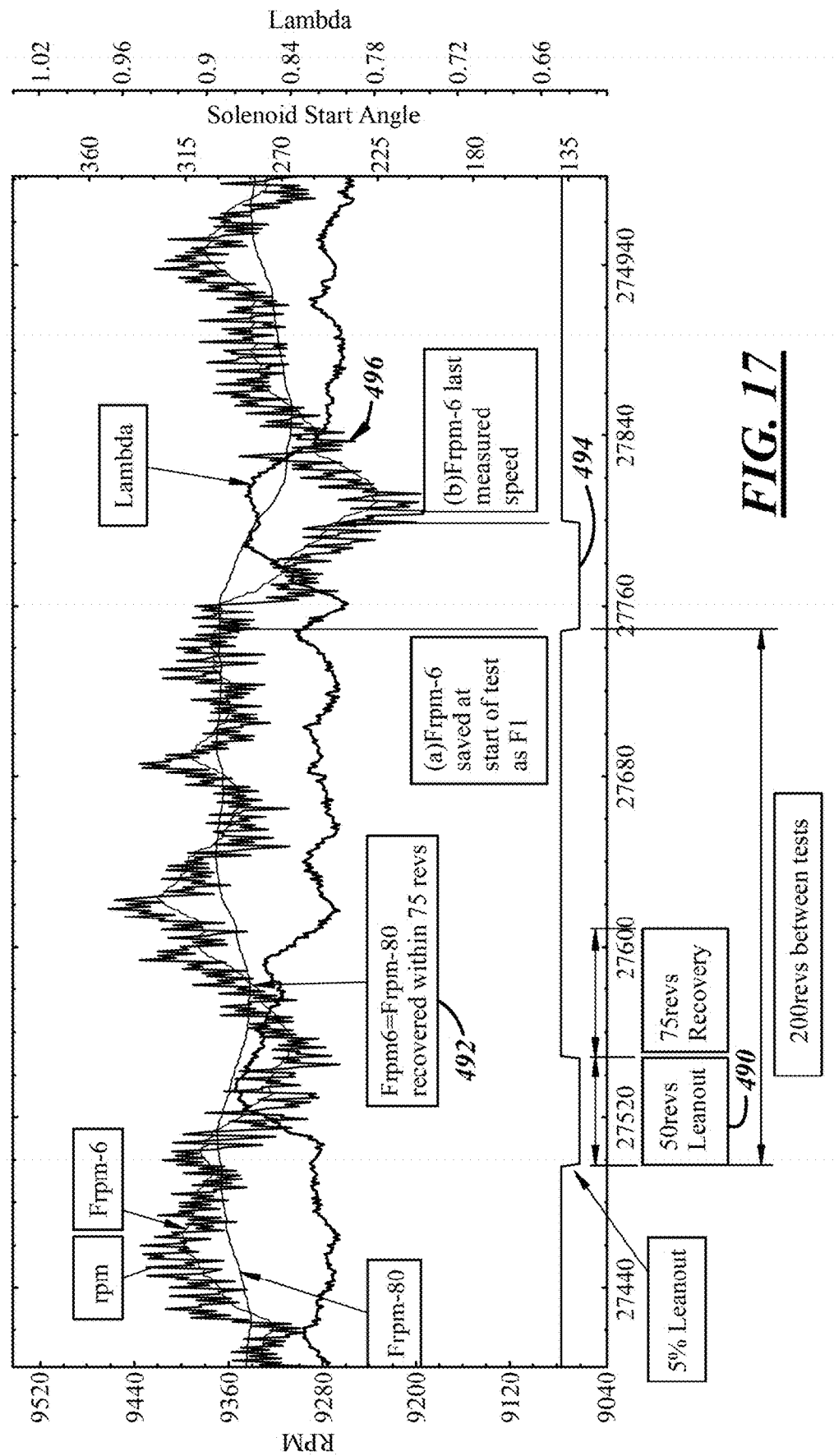
FIG. 17 is a graph showing various variables of the engine fuel control process of FIGS. 16A and 16B of a four stroke single cylinder engine.

FIGS. 16A and 16B combined, provide a flow chart of at least some of the steps of a more detailed and presently preferred fuel control process which may be used to determine and control the air-to-fuel ratio of a small displacement engine which may have a single cylinder with a displacement in the range of about 15-60 cubic centimeters ($cm^3$) including such an engine normally operating in the range of about 3,000-11,000 rpm such as, for example, the spark ignited gasoline powered single cylinder four stroke engine with a 25 $cm^3$ displacement with the lambda curves of FIG. 15. FIG. 17 illustrates a graph of engine speed and lambda data of this engine having the lambda versus RPM curves of FIG. 15 during a portion of the process of the flow chart of FIGS. 16A and 16B.

As shown in FIGS. 16A and 16B an engine control process 450 begins at 452 typically on or shortly after engine start up and proceeds to step 454 to determine if the engine is operating at a speed $R_1$ significantly greater than its idling speed, such as in the range of 6,500-10,000 rpm. If not, it returns to the start and repeats step 454 until it has determined that the engine is operating in the speed range $R_1$ and if so, proceeds to both the steps 456 and 458. In step 456, the microcontroller accumulates and stores the engine speed for 80 consecutive revolutions ($F_{RPM}$—80) on a first in, first out (FIFO) basis for use in a downstream step.

In step 458, it is determined whether or not the engine is operating at a relatively constant or stable speed by determining whether the engine speed varied by less than 250 rpm over a period of 50 consecutive revolutions. If not, the process returns to step 454. If so, the process advances to steps 460 and 462. In step 460, microcontroller counts a number of consecutive engine revolutions, such as 200 revolutions, and when it reaches 200 revolutions returns the process to step 454 and begins counting the next 200 engine revolutions. Thus, all of the remaining steps are accomplished within 200 engine revolutions or aborted and returned to step 454.

In step 462, either a total or average engine speed for 6 revolutions ($F_1$ rpm—6) is determined and held in a buffer immediately before starting a fuel mixture enleanment step 464. In step 464, the air-to-fuel ratio supplied by the carburetor to the operating engine is enleaned for a fixed number of engine revolutions significantly greater than $F_1$ rpm—6 such as, for example, 50 revolutions. In step 466, the engine speed is determined for a small number of revolutions near or at the end of the enleanment of step 464, such as the last six revolutions of the enleanment ($F_2$ rpm—6) and stored for potential use in some subsequent steps.

After ending of the enleanment, the process may advance to step 468 to determine whether the engine has recovered from the enleanment after the air-to-fuel ratio returns to that used before the start of the enleanment. In step 468, a comparison is made between the engine speed $F_1$ rpm—6 (just before enleanment) to determine whether within 75 consecutive engine revolutions it becomes approximately equal to $F_{RPM}$—80 determined in step 456. If not, the remainder of the process is aborted and it returns to the beginning of step 454. If step 468 determines the engine speed has recovered within 75 revolutions, the process may then proceed to step 470 which determines and stores the difference (Δrpm) between the engine speed near or at the end of the enleanment ($F_2$ rpm—6) and the engine speed just before starting the enleanment ($F_1$ rpm—6). Desirably, but not necessarily, this Δrpm is stored for at least a few repetitions of the steps of 454 through 468, to provide several Δrpm values (Δrpm 1-n) such as, for example, 1-5 values. The Δrpm 1-n values may be all substantially the same, or some positive and some negative. After obtaining and storing 1-n Δrpm values, the process may advance to step 472 which determines whether there is any significant change in any of the n values of Δrpm such as 5 values. If all 5 values fall within a predetermined range of speed change, such a −85 rpm to +100 rpm, step 472 considers this to be no substantial change and advances to step 474 which actuates the solenoid 8 to make a relatively small enleanment change in the air/fuel ratio such as 0.25% or a quarter of one percent and at step 476 the microcontroller changes the solenoid open time to do so.

If step 472 determines that any of the Δrpm 1-n values were a substantial change in engine speed (outside of the −85 to +100 rpm threshold), the process advances to step 478 which determines whether some fraction or portion of the speed changes such as three out of five were either positive Δrpm or negative Δrpm within 25 engine revolutions and if so, advances to step 480 which determines a relatively large change of the air/fuel ratio such as 5% should be made for the next series of n Δrpm values and advances to step 476 to control the solenoid to affect this relatively large change of the air/fuel ratio. If step 478 determines that 3 of the 5 Δrpm values were neither positive nor negative within 25 engine revolutions, the process may proceed to step 482, which determines whether at least 3 of these 5 Δrpm values were either positive or negative within 50 engine revolutions, and if so, proceeds to step 484, which determines the solenoid open time for a medium change of the air/fuel ratio such as 2½% and then advances to step 476 to control the solenoid to affect this medium change of the air/fuel ratio. In each of steps 480 and 482 if 3 of the 5 Δrpm changes ($F_2-F_1$) are positive, an enrichment of the air-to-fuel ratio of 5% or 2½% respectively, is determined and made, or if 3 of the 5 Δrpm changes are negative, an enleanment of the air-to-fuel ratio of 5% or 2½% respectively, is determined and made. In step 482, if 3 of the 5 Δrpm speed changes are neither positive nor negative, then no change is made in the air-to-fuel ratio and the process returns to the beginning of step 454.

In step 476, after each change of the solenoid closed or open time, the process returns to the beginning of step 454 to develop an updated set of Δrpm 1-n values. Since the enleanment step 464 and recovery step 468 together are carried out in 125 engine revolutions, and in step 460 the counter aborts the process after each 200 engine revolutions, the engine typically will reach a stable operating condition before the beginning of the next set of Δrpm 1-n values is determined and saved in step 470.

As illustrated in FIG. 17, if the engine is operating at an A/F ratio of lambda 0.835 at an $F_1$ rpm—6 speed of about 9,380 rpm just before its A/F ratio at 490 was enleaned 5% or to a lambda of about 0.877 for 50 revolutions, this resulted in an average engine speed for the last 6 revolutions of enleanment ($F_2$ rpm—6) of about 9,305 rpm, and after this enleanment the $F_{RPM}$—6 engine speed recovered at 492 as determined in step 468 in about 30 revolutions, and as determined in step 458 over 250 revolutions the engine speed varied by less than 200 rpm. Thus, the Δrpm [$F_2$ ($F_{RPM}$—6 last)—$F_1$($F_{RPM}$—6 before start)] of −75 rpm is a valid Δrpm, as determined and saved in step 470. The next enleanment at 494, which due to the counter of step 460, starts 200 revolutions after the first enleanment at 490, of the A/F ratio by 5% to a lambda of about 0.835 for 50 revolutions resulted in an average engine speed $F_2$ of the last 6 revolutions of this enleanment of 9,265 rpm. The average engine speed $F_1$ for the 6 revolutions just before the start of this next enleanment is 9,370 rpm. After this second enleanment the engine speed recovered at 496 within 75 revolutions as determined in step 468 and as determined in step 458 the Δ$R_1$ for this second enleanment was about 220 rpm. Thus the second enleanment produced a valid Δ$rpm_2$ engine speed change of −105 rpm as determined and stored in step 470.

The process 450 may be repeated many times per minute of engine operation and therefore can provide extremely good control of the desired air/fuel ratio of the operating engine over a wide range of operating speeds. For example, if the engine was running for one full minute at a speed in the range of 9,000-9,200 rpm the process could obtain as many as about 45 sets of valid values for Δrpm 1-5 on which to make any needed adjustments in the A/F ratio of the fuel mixture supplied by the carburetor to the running engine and with the engine operating for one minute at an essentially constant speed in the range of 7,000-7,200 rpm the process could obtain about 35 sets of valid Δrpm 1-5 values on which to make any needed adjustments in the A/F ratio.

The number (x) of engine revolutions in each of steps 456 and 468 is significantly greater than the number of engine revolutions in each of steps 462 and 466, for example, may be at least 6 times greater, and desirably at least 9 times greater. The period of enleanment of step 464 needs to be long enough to potentially provide a significant change in engine speed, and short enough that it does not significantly adversely affect engine performance. For example, in step 464 the period of enleanment may be at least 3 times, and desirably 7 times greater than the number of engine revolutions of step 462 or 466. The recovery period of step 468 may be sufficient for the engine to return to a speed at least substantially equal to its speed just before beginning the enleanment of step 464, for example, at least for the same number of engine revolutions as the period of enleanment, and desirably at least 1.25 times such engine revolutions of enleanment.

For a gasoline powered spark ignited single cylinder 4-stroke engine with a displacement of 15-60 cm³, the step 454 engine speed $R_1$ may be at least 4,500 rpm and desirably at least 5,000 rpm, Δ$R_1$ of step 458 may be at least 100 rpm for at least 20 revolutions, $F_1$ of step 462 and $F_2$ of step 466 may be for at least 3 revolutions, the enleanment of step 464 may be for at least 10 revolutions, and $F_{RPM}$ of step 456 and the recovery of step 468 may be for at least 20 revolutions.

For a gasoline powered spark ignited single cylinder 2-stroke engine with a displacement of 15-60 cm³, the step 454 engine speed $R_1$ may be at least 4,000 rpm and desirably at least 7,000 rpm, Δ$R_1$ of step 458 may be at least 100 rpm for at least 20 revolutions, $F_1$ of step 462 and $F_2$ of step 466 may be for at least 3 revolutions, the enleanment of step 464 may be for at least 20 revolutions, and $F_{RPM}$ of step 456 and the recovery of step 468 may be for at least 40 revolutions.

Since the only sensor required for implementation of the process 450 is the speed of the running engine, and this speed is already sensed and determined by the control circuitry 38 to select and provide the desired ignition timing of the operating engine, this process may be implemented without any additional sensors of other engine operating parameters and by the use of processes such as the process 450 implemented by appropriate software executed by the microcontroller and other components of the control circuit 38 to determine and change as needed the A/F ratio for efficient operation of the engine by controlling the open time or the closed time of a solenoid actuated valve controlling the quantity of fuel in the air/fuel mixture supplied by the carburetor to the running engine.

The process 450 does not require a carburetor throttle valve sensor, since in step 458 it is determined whether or not the engine speed change due to fuel enleanment probably was also caused by some other action such as a change in the extent of the opening of the carburetor throttle valve, and if so, it returns to step 454 to begin another repetition of the process 450.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A method of determining if an engine is operating at least near a lean limit of its air to fuel ratio comprising the steps of:

determining for a plurality of engine cycles the number of such engine cycles in which the engine speed either follows the normal pattern or the number of such engine cycles are outliers from such normal pattern, wherein the normal pattern is where the engine speed is lower during an engine intake stroke than during the immediately preceding engine exhaust stroke; and if less than half of the engine cycles of such plurality follow the normal pattern or at least half are outliers from the normal pattern, then enriching the fuel to air ratio.

2. The method of claim 1 wherein for each engine cycle of the plurality of engine cycles it is determined whether or not each pair of engine speeds for an intake stroke and preceding exhaust stroke follows the normal pattern.

3. The method of claim 2 wherein if less than half of the engine speed pairs follow the normal pattern or at least half are outliers from the normal pattern the fuel to air ratio is enriched.

4. The method of claim 3 wherein the fuel to air ratio is enriched by at least 5%.

5. The method of claim 1 wherein each plurality of engine cycles includes at least 16 engine cycles.

6. The method of claim 1 wherein for each engine cycle of the plurality of engine cycles it is determined whether at least half of each pair of engine speeds are outliers from the normal pattern and if so the fuel to air ratio is enriched.

7. The method of claim 6 wherein each plurality of engine cycles includes at least 16 successive pairs of engine speeds.

8. The method of claim 1 wherein each plurality of engine cycles includes at least 16 successive pairs of engine speeds.

9. The method of claim 1 wherein it is determined whether for the plurality of engine cycles the engine speed is at least 5,000 rpm and if not the fuel to air ratio is not enriched.

\* \* \* \* \*